(12) United States Patent
Hakamata et al.

(10) Patent No.: US 10,872,060 B2
(45) Date of Patent: Dec. 22, 2020

(54) SEARCH METHOD AND SEARCH APPARATUS

(71) Applicant: FUJITSU LIMITED, Kawasaki (JP)

(72) Inventors: Yukari Hakamata, Yokohama (JP); Junki Hakamata, Yokohama (JP); Masahiro Kataoka, Kamakura (JP); Ryosuke Hyogo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 380 days.

(21) Appl. No.: 15/717,248

(22) Filed: Sep. 27, 2017

(65) Prior Publication Data

US 2018/0095982 A1   Apr. 5, 2018

(30) Foreign Application Priority Data

Oct. 5, 2016   (JP) ................ 2016-197461

(51) Int. Cl.
   *G06F 16/13*   (2019.01)
   *G06F 21/60*   (2013.01)
   *G06F 16/14*   (2019.01)
   *G06F 21/62*   (2013.01)

(52) U.S. Cl.
   CPC ............ *G06F 16/13* (2019.01); *G06F 16/148* (2019.01); *G06F 21/602* (2013.01); *G06F 21/6245* (2013.01)

(58) Field of Classification Search
   CPC .... G06F 16/13; G06F 21/6245; G06F 16/148; G06F 21/602
   See application file for complete search history.

(56) References Cited

U.S. PATENT DOCUMENTS

| 5,953,723 | A | * | 9/1999 | Linoff | ................... G06F 16/328 |
| 6,906,644 | B2 | * | 6/2005 | Satoh | .................. H03M 7/3084 |
| | | | | | 341/51 |
| 2011/0119481 | A1 | * | 5/2011 | Auradkar | .............. G06F 21/602 |
| | | | | | 713/150 |

(Continued)

FOREIGN PATENT DOCUMENTS

| JP | 3-19081 | 1/1991 |
| JP | 2002-175217 | 6/2002 |

(Continued)

*Primary Examiner* — Pierre M Vital
*Assistant Examiner* — Zuheir A Mheir
(74) *Attorney, Agent, or Firm* — Xsensus LLP

(57) ABSTRACT

A search apparatus encodes a plurality of elements, each of which is a unit of encoding, stored in a plurality of items, in a file that includes a plurality of records each including the plurality of items separated by delimiters, with use of an encoding dictionary indicating corresponding relationships between the elements and codes. Further, the search apparatus generates an index that associates the elements with positions of the respective elements in the file. Then, the search apparatus generates mask information indicating a range of a specific search target item among the plurality of items, in the file. The search apparatus searches for one or more element strings satisfying a search condition, from among search target elements that are indicated by the index as being within the range of the search target item indicated in the mask information, based on the search condition.

10 Claims, 33 Drawing Sheets

(56) References Cited

U.S. PATENT DOCUMENTS

| | | | | |
|---|---|---|---|---|
| 2011/0145593 | A1* | 6/2011 | Auradkar | G06F 21/6218 |
| | | | | 713/189 |
| 2012/0114119 | A1* | 5/2012 | Ahuja | H04L 63/0853 |
| | | | | 380/44 |
| 2013/0013605 | A1* | 1/2013 | Stanfill | G06F 16/213 |
| | | | | 707/737 |
| 2013/0181851 | A1* | 7/2013 | Kataoka | H03M 5/02 |
| | | | | 341/52 |
| 2013/0287210 | A1* | 10/2013 | Matsuda | H04L 9/0894 |
| | | | | 380/44 |
| 2014/0059075 | A1* | 2/2014 | Kataoka | G06F 16/13 |
| | | | | 707/769 |
| 2014/0156670 | A1* | 6/2014 | Hosomi | G06F 16/245 |
| | | | | 707/741 |
| 2014/0201520 | A1* | 7/2014 | Yacobi | H04L 9/3073 |
| | | | | 713/158 |
| 2015/0356128 | A1* | 12/2015 | Nishimura | G06F 16/2237 |
| | | | | 707/745 |
| 2016/0210470 | A1* | 7/2016 | Rozenberg | G06F 16/22 |
| 2018/0046753 | A1* | 2/2018 | Shelton | G16H 80/00 |

FOREIGN PATENT DOCUMENTS

| | | |
|---|---|---|
| JP | 2010-282304 | 12/2010 |
| JP | 2013-8121 | 1/2013 |
| JP | 2014-524090 | 9/2014 |
| WO | WO 2012/176374 A1 | 12/2012 |

* cited by examiner

151a AUTHORITY MANAGEMENT TABLE

| AUTHORITY ID | COLUMN 1 (BRANCH NAME) | COLUMN 2 (NAME) | COLUMN 3 (ADDRESS) | COLUMN 4 (GENDER) | COLUMN 5 (My Number) | COLUMN 6 (PERFORMANCE: EXCELLENT, GOOD, AVERAGE) |
|---|---|---|---|---|---|---|
| UID01 (MANAGER) | ○ | ○ | ○ | ○ | ○ | ○ |
| UID02 (EMPLOYEE A) | ○ | ○ | × | ○ | × | ○ |

○: AUTHORIZED
×: UNAUTHORIZED

152 AUTHORITY MANAGEMENT TABLE

| AUTHORITY ID | COLUMN-CONTENT-BASED AUTHORITY DESIGNATION | COLUMN 1 (BRANCH NAME) | COLUMN 2 (NAME) | COLUMN 3 (ADDRESS) | COLUMN 4 (GENDER) |
|---|---|---|---|---|---|
| UID01 (ab branch) | Branch name (COLUMN 1) is not ab branch | ○ | × | × | ○ |
| UID02 (NO branch) | Branch name (COLUMN 1) is ab branch | ○ | ○ | ○ | ○ |
| | — | ○ | ○ | ○ | ○ |

○: AUTHORIZED
×: UNAUTHORIZED

FIG. 18 kanji characters — (ab branch), Yokohama
kanji characters — (NO branch)

153 AUTHORITY MANAGEMENT TABLE

| AUTHORITY ID | EXCLUDED RECORD DESIGNATION | COLUMN 1 (BRANCH NAME) | COLUMN 2 (NAME) | COLUMN 3 (ADDRESS) |
|---|---|---|---|---|
| UID01 | Records including "NO" | ○ | ○ | ○ |
| UID02 | — | ○ | ○ | × |

○: AUTHORIZED
×: UNAUTHORIZED

FIG. 24

154 AUTHORITY MANAGEMENT TABLE

| AUTHORITY ID | SEARCH TARGET RECORD DESIGNATION | COLUMN 1 (DEPARTMENT CODE) | COLUMN 2 (EMPLOYEE NUMBER) | COLUMN 3 (NAME) |
|---|---|---|---|---|
| UID01 | Department code (COLUMN 1) is "1001 – 1030" | ○ | ○ | ○ |
| UID02 | — | ○ | ○ | × |

○: AUTHORIZED
×: UNAUTHORIZED

FIG. 29

SEARCH METHOD AND SEARCH APPARATUS

CROSS-REFERENCE TO RELATED APPLICATION

This application is based upon and claims the benefit of priority of the prior Japanese Patent Application No. 2016-197461, filed on Oct. 5, 2016, the entire contents of which are incorporated herein by reference.

FIELD

The embodiments discussed herein are related to a search method and a search apparatus.

BACKGROUND

Information used in computers is stored in predetermined formats. For example, information used in business forms is often stored as a text file in csv (comma-separated values) format.

A business form includes a plurality of columns. Each record registered in the business form has fields corresponding to the columns. Each field stores a number or a character string (column data) in accordance with the attribute of the corresponding column. Each column is associated with an attribute indicating the meaning of column data that is stored in the field corresponding to that column. Depending on the attribute of the column, highly confidential column data may be registered in the corresponding field. For example, there is a column for registering highly confidential personal information such as "My Number" (a number assigned to each resident of Japan). If such highly confidential information is included in a business form, the entire file of the business form is stored in an encrypted manner, for example.

As a technique for improving data security, for example, there has been proposed a database access management system that implements countermeasures against unauthorized access and the like, reduces time and effort to perform work such as mask processing and the like, and performs flexible mask processing and the like in accordance with the intended use of data. There has also been proposed a data management and retrieval system that reliably restricts disclosure of a column that needs to be kept confidential, depending on who the user is. There has also been proposed a database system that implements various access controls on a database.

See, for example, Japanese Laid-open Patent Publications No. 2013-008121, No. 2010-282304, and No. 2002-175217.

In the case of using information with a low confidentiality level in a business form file stored in an encrypted manner, the entire business form file is decrypted, and then the information to be used is extracted from the business form file. In this case, although only the information with a low confidentiality level needs to be extracted, highly confidential information is also decrypted, which reduces the level of information security.

In view of the above, only the items storing highly confidential information in the business form may be encrypted. However, in many large scale systems, an index for finding information in a business form is provided. Even in the case where the items storing highly confidential information are encrypted, if the presence of that information is indicated by the index, the highly confidential information may be retrieved in response to a search request. Thus, the presence of that information is recognized even by the user who is not authorized to access that information. That is, when performing an index search on a business form using conventional techniques, it is not possible to restrict the search in accordance with whether the user has authority for each column, record, and page in the business form. Accordingly, highly confidential information is not sufficiently secured.

SUMMARY

According to one aspect of the embodiments, there is provided a non-transitory computer-readable storage medium storing a computer program that causes a computer to perform a process including: encoding a file that includes a plurality of records each including a plurality of items separated by delimiters, in units of elements included in the plurality of items of the plurality of records, with use of an encoding dictionary indicating corresponding relationships between the elements and codes; generating an index that associates the elements with positions of the respective elements in the file; generating mask information indicating a range of a specific search target item among the plurality of items, in the file; and searching for one or more element strings satisfying a search condition, from among search target elements that are indicated by the index as being within the range of the search target item indicated in the mask information, based on the search condition.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 illustrates an example of authority-based search results in accordance with search authority of users;

FIG. 15 illustrates an example of search authority;

FIG. 18 illustrates an example of an authority management table according to a third embodiment;

FIG. 24 illustrates an example of an authority management table according to a fourth embodiment;

FIG. 29 illustrates an example of an authority management table according to a fifth embodiment;

DESCRIPTION OF EMBODIMENTS

Figure 1:
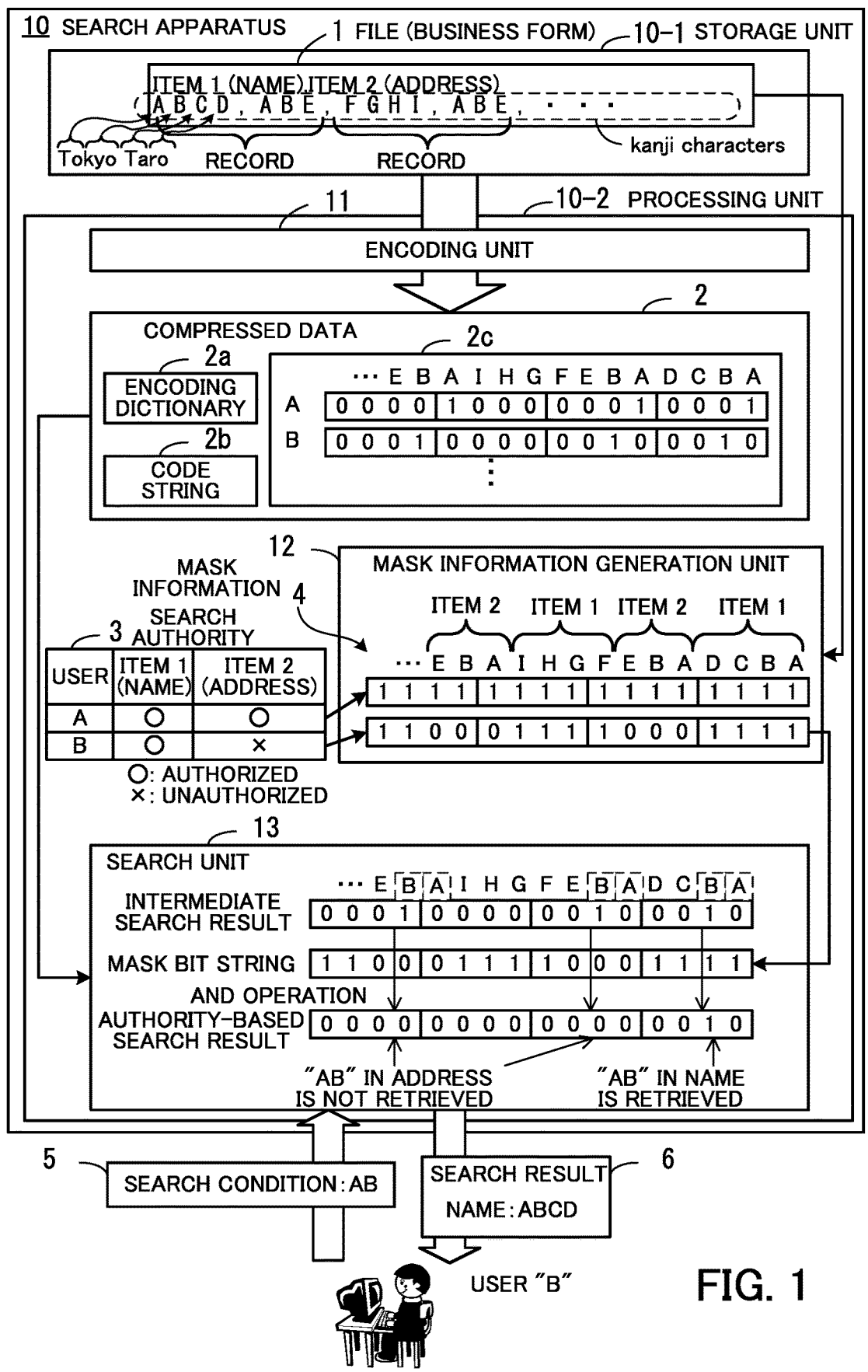
FIG. 1 illustrates an exemplary configuration of a search apparatus according to a first embodiment.

Several embodiments will be described below with reference to the accompanying drawings, wherein like reference numerals refer to like elements throughout. Features of certain embodiments may be combined with features of other embodiments as long as no inconsistency arises.

(a) First Embodiment

Hereinafter, a first embodiment will be described.

FIG. 1 illustrates an exemplary configuration of a search apparatus according to the first embodiment. A search apparatus 10 of the first embodiment includes a storage unit 10-1 and a processing unit 10-2. The storage unit 10-1 is, for example, a memory or a storage device of the search apparatus 10. The processing unit 10-2 is, for example, a processor of the search apparatus 10.

The storage unit 10-1 stores a file 1 that includes a plurality of records each including a plurality of items separated by delimiters. A delimiter is a symbol or a special character that separates elements in a list. The file 1 is, for example, text data in a CSV format. When the file 1 is text data in a CSV format, each comma separating the items is a delimiter.

The processing unit 10-2 includes an encoding unit 11, a mask information generation unit 12, and a search unit 13.

The encoding unit 11 encodes the file 1 to generate compressed data 2. For example, the encoding unit 11 encodes the file 1 in units of elements included in the plurality of items of the plurality of records, with use of an encoding dictionary 2a indicating the corresponding relationships between the elements and codes. Thus, a code string 2b including a sequence of codes is generated. Each element as a unit of encoding may be, for example, a word or a number. In the example of FIG. 1, each element as a unit of encoding is a single character.

Further, the encoding unit 11 generates an index 2c that associates the elements with the positions of the respective elements in the file 1. The index 2c includes a bit string for each of the characters that appear in the file 1, for example. The bit string indicates the positions where the character appears. The bits of the bit string are sequentially associated with the elements in the file 1, starting with the element at the top of the file 1. In the bit string, if the character of an element is the character corresponding to the bit string, the bit corresponding to the element is set to "1". For example, in the bit string corresponding to "東", the bits corresponding to the element of "東" in the file 1 are set to "1".

The encoding unit 11 puts together the encoding dictionary 2a used for encoding, the generated code string 2b, and the generated index 2c together to obtain compressed data 2 of the file 1. The encoding unit 11 stores the generated compressed data 2 in the memory or the storage device of the search apparatus 10.

The mask information generation unit 12 generates mask information 4 indicating the range of a specific search target item among the plurality of items, in the file 1. A specific search target item is, for example, an item allowed to be searched. The mask information 4 is a bit string (mask bit string) of the bits corresponding to the respective elements in the file 1, for example. In the mask information 4, for example, the bits corresponding to the elements stored in the search target item are set to "1", while the bits corresponding to the elements stored in the items other than the search target item are set to "0". In this case, the range of the bits with the value "1" is the range of the search target item in the file 1.

The mask information generation unit 12 may determine a search target item, based on which of attributes of items the user who enters a search condition is authorized to search. For example, search authority 3 of each user may be specified in advance in the search apparatus 10. The mask information generation unit 12 generates the mask information 4 for each user, based on the search authority 3 of each user. In the example of FIG. 1, a user "A" is authorized to search all the attributes of the items. Accordingly, in the mask bit string representing the mask information 4 corresponding to the user "A", the values of all the bits are set to 1 Meanwhile, a user "B" is authorized to search "ITEM 1", which is an item for storing the name, but is not authorized to search "ITEM 2", which is an item for storing the address. Accordingly, in the mask bit string representing the mask information 4 corresponding to the user "B", the bits corresponding to the range of "ITEM 1" are set to "1", and the bits corresponding to the range of "ITEM 2" are set to "0".

The search unit 13 searches for one or more element strings satisfying a search condition 5, from among search target elements that are indicated by the index 2c as being within the range of the search target item indicated in the mask information 4, based on the search condition 5. For example, the search unit 13 first searches for an element string satisfying the search condition 5, based on the index 2c, without taking into consideration the search authority. This search result is an intermediate search result. Then, the search unit 13 performs a bitwise AND (logical AND) operation between the intermediate search result and the mask bit string. This operation result is a search result (authority-based search result) with the search authority taken into consideration. In the authority-based search result, the bit corresponding to the position of the last element of the element string retrieved by the search is set to "1".

Note that in the case where a mask bit string is generated for each user, the search unit 13 performs a search using the mask bit string of the user who entered the search condition 5. In the example of FIG. 1, the search condition 5 is entered by the user "B". The search condition 5 specifies an exact match with a character string "東京" (Tokyo). In this case, the search unit 13 refers to the bit string corresponding to "東" (To) and the bit string corresponding to "京" (kyo) in the index 2c. Then, the search unit 13 refers to, in the bit string of "京", the value of the bit corresponding to the bit (the adjacent bit on the left in FIG. 1) following the bit "1" in the bit string of "東". If the value of the corresponding bit is "1", the search unit 13 determines that there is an element string representing "東京" in the position of that bit. Then, the search unit 13 generates an intermediate search result in which "1" is set in the position corresponding to "京" of the element string representing "東京". In the example of FIG. 1, the authority-based search result is obtained by an AND operation between the intermediate search result and the mask bit string of the user "B". In this example, a character string "東京" included in "ITEM 2" for address is not retrieved, but a character string "東京" included in "ITEM 1" for name is retrieved.

The search unit 13 obtains, from the code string 2b, the code corresponding to the item in the retrieved position indicated in the authority-based search result, or the code corresponding to the entire record to which the item belongs, and decodes the code using the encoding dictionary 2a. Then, the search unit 13 outputs the element string obtained by decoding as a search result 6. In the example of FIG. 1, the elements stored in the item retrieved by the search are decoded, so that the search result 6 indicating a character string "東京太郎" (Tokyo Taro) is output.

With the search apparatus 10 described above, it is possible to easily limit the items in a business form that are allowed to be searched, in accordance with the search authority. For example, the search authority is not given for the item storing highly confidential information. Thus, when a search condition for searching for highly confidential information is entered, the information is prevented from being retrieved. Accordingly, the security of highly confidential information is improved.

Further, the search apparatus 10 allows to assign different levels of search authority to different users. Thus, for example, users with a higher level of authority are allowed to search highly confidential information, so that the convenience of carrying out operations using a business form is improved. Meanwhile, users with a lower level of authority are not allowed to search highly confidential information, so that the security of the highly confidential information is maintained. Accordingly, it is possible to effectively use the data on the business form while maintaining confidentiality.

Note that in the encoding dictionary 2a, information of at least one or more of the elements that are encoded may be encrypted. For example, super-confidential information such as My Number is encrypted in the encoding dictionary 2a. Thus, the security of highly confidential information is further improved.

Further, since a mask bit string including the bits corresponding to the respective elements is used as the mask information 4, it is possible to precisely specify search targets. For example, the mask information generation unit 12 is able to determine, for each item of the record, whether to specify the item as a search target item, based on whether the element stored in an item of a specific attribute in the record satisfies a predetermined condition. Further, the mask information generation unit is also able to determine whether to exclude all the items of a record from the search target items, based on the content stored in an item of the record. Further, the mask information generation unit 12 may determine to exclude all the items of a record from the search target items when a specific word is included in the record. Further, the mask information generation unit 12 may determine to exclude all the items of a record from the search target items when the number stored in a specific item of the record is outside a specific number range.

In the manner described above, a determination of whether to search items of each record is made in accordance with the content of the record. Thus, it is possible to prevent a search on a record indicating highly confidential personal information. Further, it is possible to change search target items in accordance with the relationship between the user performing a search and the person indicated in a search target record (for example, in accordance with whether the user belongs to the same department as the person).

Further, the range of search may be specified in the mask information 4 in advance. Even when the range of search is adjusted in details, processing load of the search is not increased. Accordingly, it is possible to perform a flexible search without increasing the load of searching.

Note that the encoding unit 11, the mask information generation unit 12, and the search unit 13 of FIG. 1 may be implemented by, for example, the processor of the search apparatus 10. For example, the search apparatus 10 that performs a search with the method illustrated in FIG. 1 is implemented by causing the processor to execute a search program describing the processing performed by the encoding unit 11, the mask information generation unit 12, and the search unit 13. The lines connecting the components of FIG. 1 represent some of communication paths. Communication paths other than those of FIG. 1 may be provided.

(b) Second Embodiment

Next, a second embodiment will be described. According to the second embodiment, a business form in CSV form is compressed and stored, and a search is performed on the business form using the index of data contained in the business form.

Figure 2:
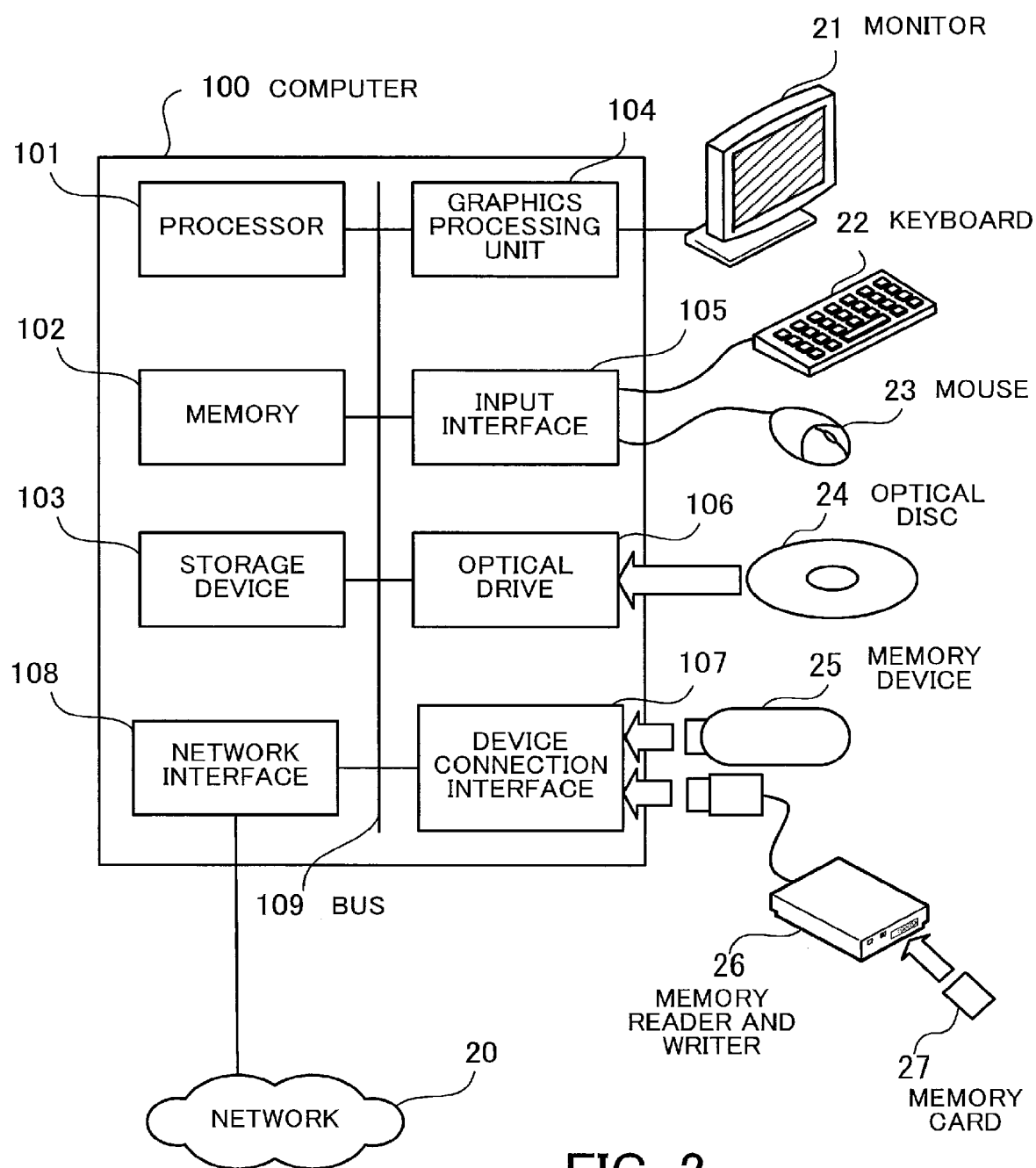
FIG. 2 illustrates an exemplary hardware configuration of a computer used in a second embodiment.

FIG. 2 illustrates an exemplary hardware configuration of a computer used in the second embodiment. The entire operation of a computer 100 is controlled by a processor 101. A memory 102 and a plurality of peripheral devices are connected to the processor 101 via a bus 109. The processor 101 may be a multiprocessor. Examples of the processor 101 include central processing unit (CPU), micro processing unit (MPU), and digital signal processor (DSP). At least a part of functions provided by a program executed by the processor 101 may be implemented by using electronic circuits such as application-specific integrated circuit (ASIC), programmable logic device (PLD), and the like.

The memory 102 is used as a primary storage device of the computer 100. The memory 102 temporarily stores at least part of the operating system (OS) program and application programs that are executed by the processor 101. The memory 102 also stores various types of data needed for the processing performed by the processor 101. Examples of the memory 102 include volatile semiconductor storage device such as random access memory (RAM) and the like.

The peripheral devices connected to the bus 109 include a storage device 103, a graphics processing unit 104, an input interface 105, an optical drive 106, a device connection interface 107, and a network interface 108.

The storage device 103 electrically or magnetically writes data to and reads data from its internal storage medium. The storage device 103 is used as a secondary storage device of the computer. The storage device 103 stores the OS program, application programs, and various types of data. Examples of the storage device 103 include hard disk drive (HDD), and solid state drive (SSD).

A monitor 21 is connected to the graphics processing unit 104. The graphics processing unit 104 displays an image on the screen of the monitor 21, in accordance with an instruction from the processor 101. Examples of the monitor 21 include display device using a cathode ray tube (CRT), liquid crystal display device, and the like.

A keyboard 22 and a mouse 23 are connected to the input interface 105. The input interface 105 receives signals from the keyboard 22 and the mouse 23, and transmits the received signals to the processor 101. The mouse 23 is an example of a pointing device, and other types of pointing devices may also be used. Examples of other types of pointing devices include touch panel, tablet, touch pad, track ball, and the like.

The optical drive 106 reads data from an optical disc 24 by using laser beams or the like. The optical disc 24 is a portable storage medium and stores data such that the data may be read through optical reflection. Examples of the optical disc 24 include digital versatile disc (DVD), DVD-RAM, compact disc read only memory (CD-ROM), CD-Recordable (CD-R), CD-Rewritable (CD-RW), and the like.

The device connection interface 107 is a communication interface that connects peripheral devices to the computer 100. For example, a memory device 25 and a memory reader and writer 26 may be connected to the device connection interface 107. The memory device 25 is a storage medium having a function to communicate with the device connection interface 107. The memory reader and writer 26 is a device that writes data to and reads data from a memory card 27. The memory card 27 is a card-type storage medium.

The network interface 108 is connected to a network 20. The network interface 108 exchanges data with other computers or communication apparatuses via the network 20.

With the hardware configuration described above, it is possible to provide the processing functions of the second embodiment. Note that, the apparatus of the first embodiment may be implemented with a hardware configuration similar to that of the computer 100 of FIG. 2.

The computer 100 provides the processing functions of the second embodiment by executing a program stored in a computer-readable storage medium, for example. The program describing the procedure to be performed by the computer 100 may be stored in various storage media. For example, the program to be executed by the computer 100 may be stored in the storage device 103. The processor 101 loads at least part of the program from the storage device 103 into the memory 102 so as to execute the program. The program to be executed by the computer 100 may also be stored in a portable storage medium, such as the optical disc 24, the memory device 25, the memory card 27, and the like. The program stored in the portable storage medium may be executed after being installed into the storage device 103 under the control of, for example, the processor 101. Further, the processor 101 may execute the program by reading the program directly from the portable storage medium.

The following describes the function of the computer 100 for performing a business form search using the computer 100.

Figure 3:
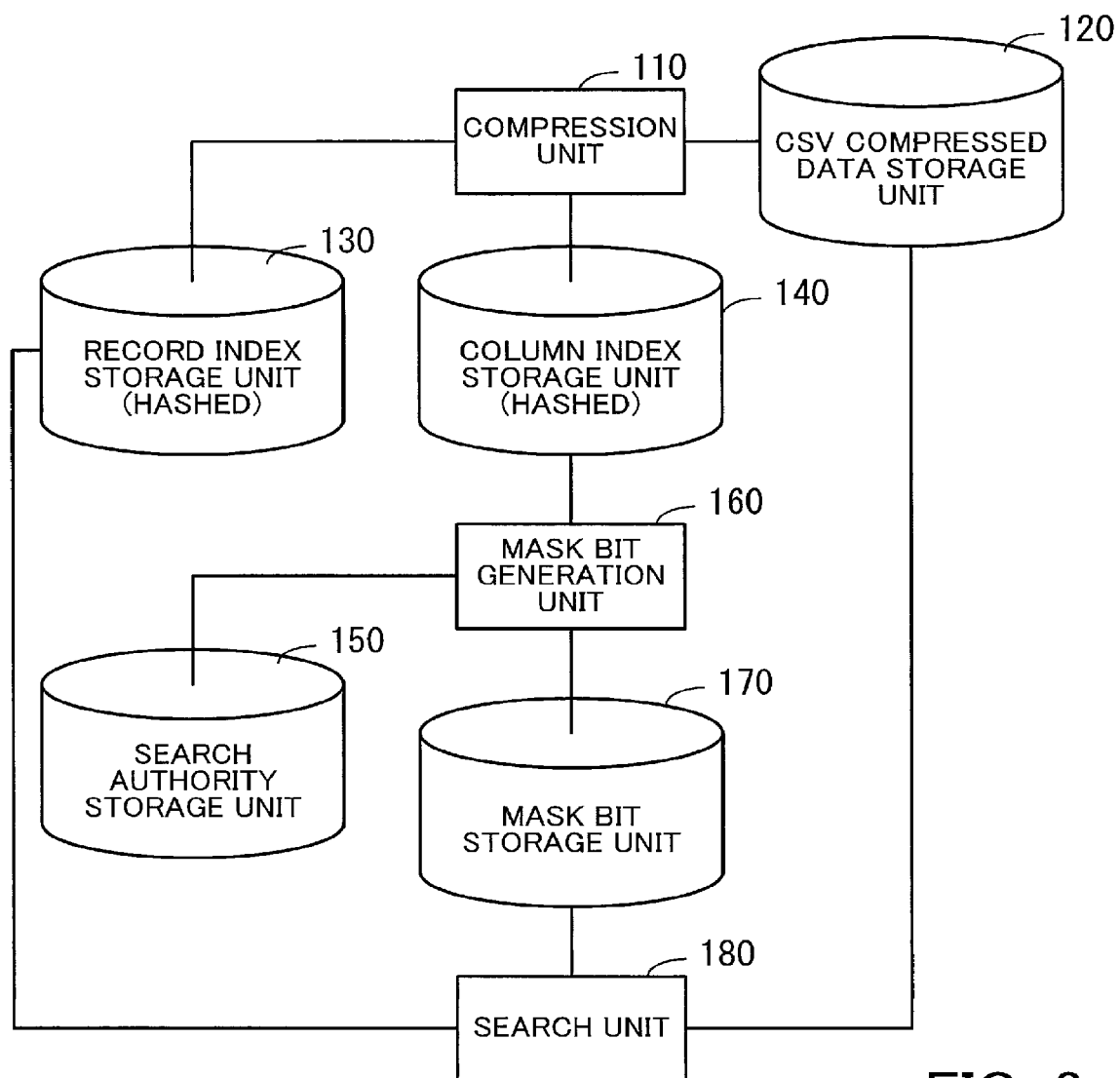
FIG. 3 is a block diagram illustrating a business form search function.

FIG. 3 is a block diagram illustrating a business form search function. The computer 100 includes a compression unit 110, a CSV compressed data storage unit 120, a record index storage unit 130, a column index storage unit 140, a search authority storage unit 150, a mask bit generation unit 160, a mask bit storage unit 170, and a search unit 180.

The compression unit 110 compresses the data of a business form in a CSV format. The compression unit 110 stores the compressed data in the CSV compressed data storage unit 120. Further, the compression unit 110 creates a record index and a column index when compressing the business form. The record index is information indicating the position of each record in the business form. The column index is information indicating the position of each field corresponding to each column in the business form. The compression unit 110 hashes the created column index with, for example, a predetermined algorithm, and stores the hashed column index in the column index storage unit 140.

The CSV compressed data storage unit 120 stores compressed data (CSV compressed data) obtained by compressing the business form data in a CSV format. The CSV compressed data includes a code string generated by data compression, an encoding dictionary indicating the corresponding relationships between characters and codes obtained by compressing the characters, and an index indicating the positions where the compressed characters appear in the business form.

The record index storage unit 130 stores a record index. The record index is hashed to reduce the data amount.

The column index storage unit 140 stores a column index. The column index is hashed to reduce the data amount.

The search authority storage unit 150 stores the search authority of each user. For example, the search authority is set for each column.

The mask bit generation unit 160 generates a mask bit string for each user, in accordance with the search authority of that user. The mask bit string is a plurality of bits indicating whether the user is allowed to search column data in the fields corresponding to each column. The mask bit generation unit 160 stores the generated mask bit string in the mask bit storage unit 170.

The mask bit storage unit 170 stores the mask bit string generated by the mask bit generation unit 160.

When a search query is entered, the search unit 180 searches the business form using the CSV compressed data, in accordance with the search authority of the user who entered the search query. For example, the search unit 180 searches CSV compressed data, using a search query, without any restrictions. Then, the search unit 180 reads a mask bit string of the user who entered the search query, from the mask bit storage unit 170. The search unit 180 excludes, from the search result without restriction, information related to column data in the fields of the column for which search authority is not given, using the mask bit string, and thereby generates a search result in accordance with the search authority. Based on the search result in accordance with the search authority, the search unit 180 determines a business form that matches a condition indicated by a search query from the CSV compressed data, and decodes and outputs the business form.

Note that the lines connecting the components in FIG. 3 represent some of communication paths. Communication paths other than those of FIG. 3 may be provided. Further, the functions of each component illustrated in FIG. 3 may be provided by, for example, causing a computer to execute a program module corresponding to the component.

Figure 4:
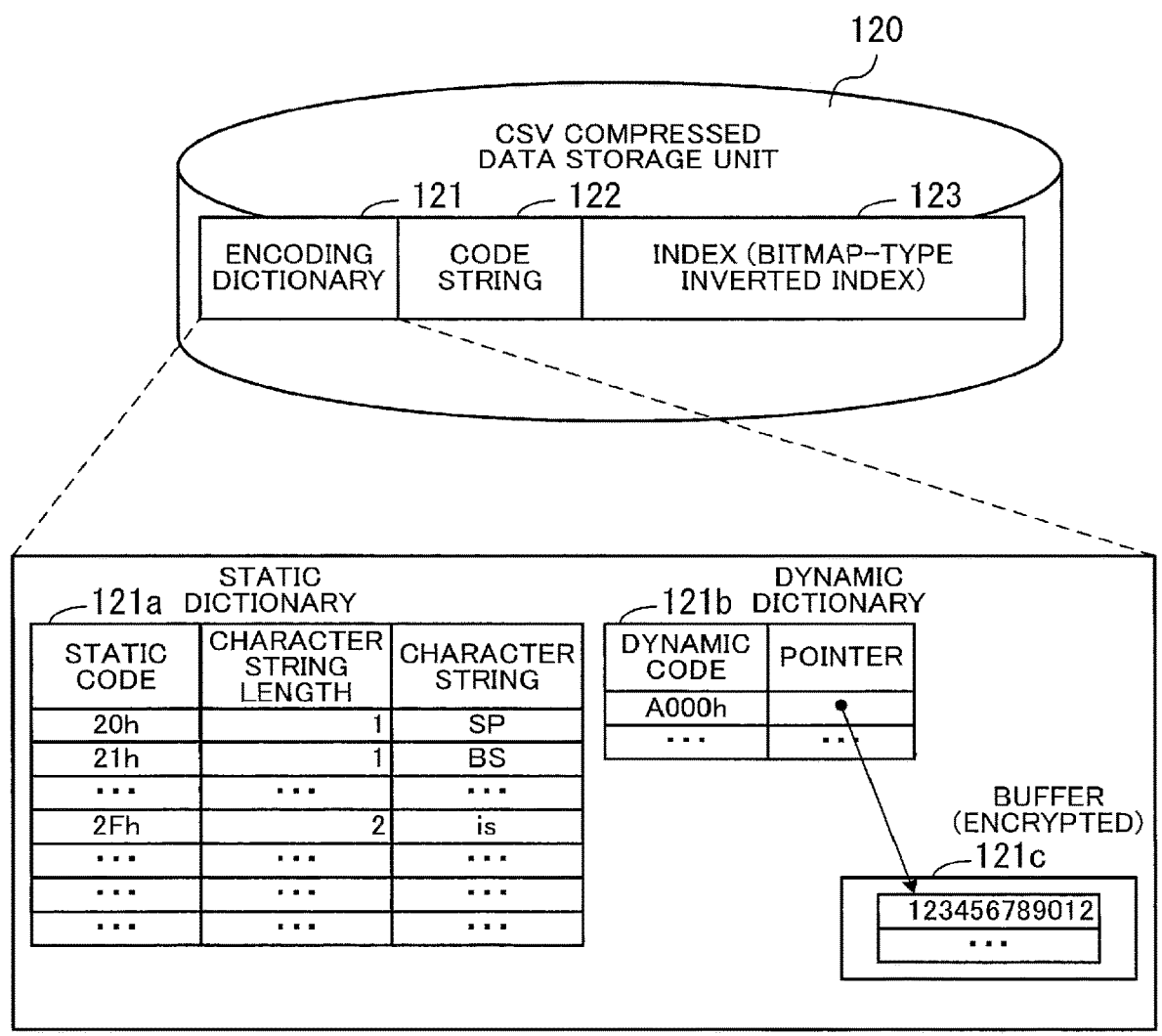
FIG. 4 illustrates an example of a CSV compressed data storage unit.

FIG. 4 illustrates an example of a CSV compressed data storage unit. The CSV compressed data storage unit 120 stores, for example, an encoding dictionary 121, a code string 122, and an index 123.

The encoding dictionary 121 indicates the corresponding relationships between words and codes. For example, based on the frequency of occurrence of each English or Japanese word, a one-byte or two-byte code is assigned to each high-frequency word in advance. Further, in the encoding dictionary 121, a two-byte or three-byte code is dynamically assigned to each low-frequency word or number every time that word or number appears.

For example, the encoding dictionary 121 includes a static dictionary 121a for high-frequency words, and a dynamic dictionary 121b for low-frequency words. The static dictionary 121a stores, in association with a code (static code) that is set statically, a character string that is converted into the code, and the length of the character string. The dynamic dictionary 121b stores, in association with a code (dynamic code) that is set dynamically upon appearance of a number or a character string, a pointer to the number or the character string that is converted into the code. The number or the character string to be converted into dynamic codes is stored in a buffer 121c.

When the numbers stored in the buffer 121c are highly confidential information such as My Number, it is possible to improve the security of the highly confidential information by encrypting the buffer 121c.

A code string is an array of codes obtained by encoding the words included in CSV data to be compressed, in accordance with the encoding dictionary 121.

The index is information indicating keywords such as words included in the business form and the like. The index is, for example, a bitmap-type inverted index.

Figure 5:
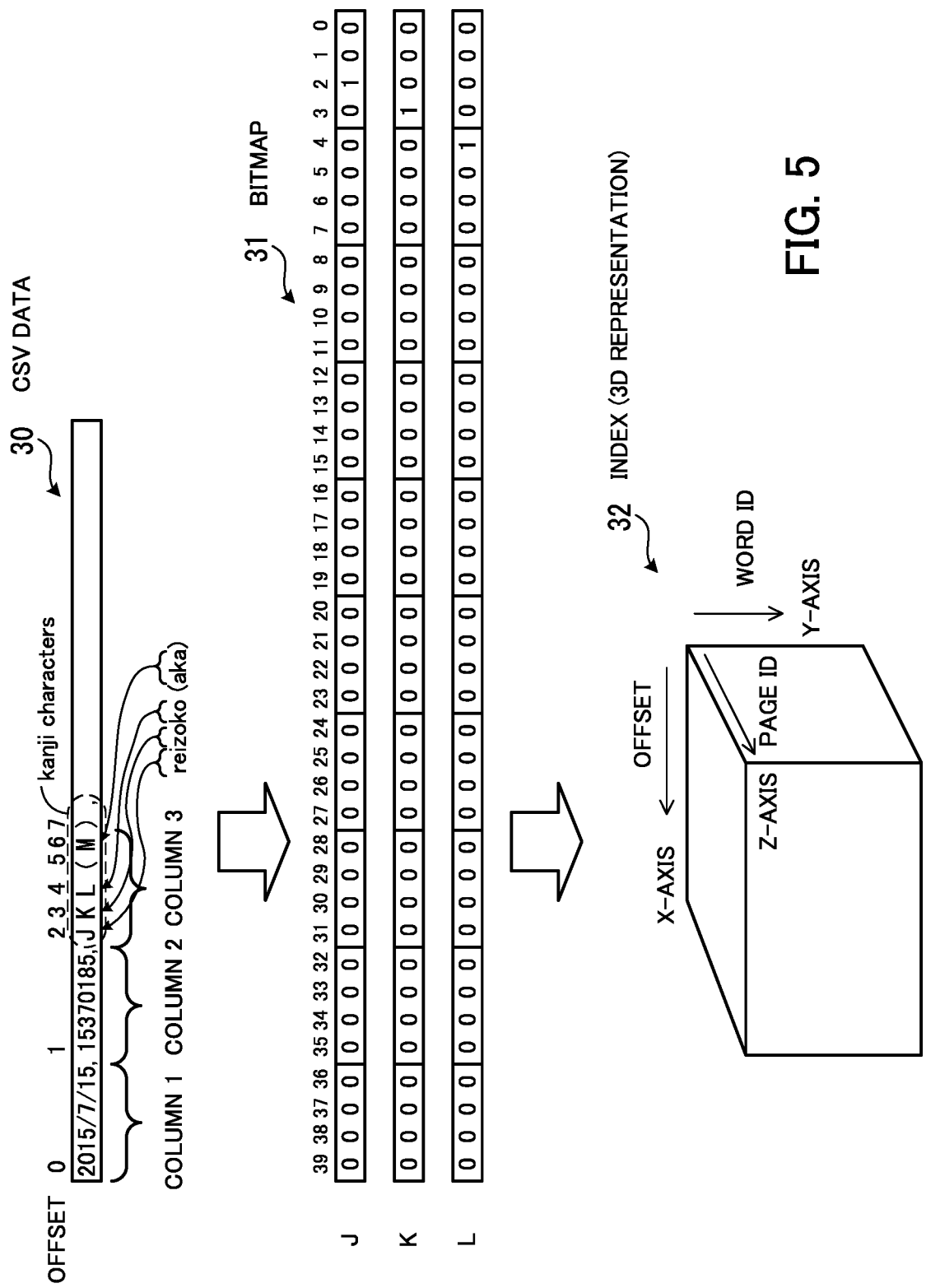
FIG. 5 illustrates an example of generation of an index.

FIG. 5 illustrates an example of generation of an index. CSV data 30 has a plurality of fields corresponding to columns. The fields are separated by commas. Each field stores column data corresponding to the attribute of the corresponding column. In the example of FIG. 5, the field of "COLUMN 1" stores column data "2015/7/15" indicating the date. The field of "COLUMN 2" stores column data "15370185" indicating a number. The field of "COLUMN 3" stores column data "冷蔵庫（赤）" (reizoko (aka)) (refrigerator (red)) indicating the name of goods. Note that the CSV data 30 includes a plurality of records, and each record includes pieces of column data of "COLUMN 1", "COLUMN 2", "COLUMN 3", and so on.

As for the characters and numbers included in the CSV data 30, their positions in the CSV data 30 are indicated by the offset. In the case of kana and kanji character, an offset is applied to each character. In the case of alphanumeric characters, an offset is applied to each set of alphanumeric characters contained in a field. The offset indicates the position of each character or each set of alphanumeric characters to which an offset is applied, from the top of the CSV data 30. In the example of FIG. 5, the offset of "2015/7/15" is "0". The offset of "15370185" is "1". As for "冷蔵庫（赤）" an offset is applied to each character. That is, offsets "2" to "7" are applied, respectively.

A bitmap 31 represents where the alphanumeric characters and other characters appear in the CSV data 30. For example, the bitmap 31 includes bit strings, one for each word that appears in the CSV data 30. In each bit string illustrated in FIG. 5, the bits are sequentially associated with offsets, starting with the rightmost (top) bit. In each bit string corresponding to a word, the value of the bit corresponding to the offset indicating the position of the word is "1", and the values of the other bits are "0". For example, the offset of a character "冷" (rei) is "2". Thus, in the bit string corresponding to "冷" in the bitmap 31, the bit corresponding to the offset "2" is set to "1". If the character "冷" also appears in another position, the bit corresponding to the offset of that position is set to "1".

The bitmap 31 described above is provided for each page of the business form, for example. A set of bitmaps 31 of the respective pages forms an index 32. The index 32 may be represented in a three-dimensional space where the X-axis indicates the offset; the Y-axis indicates the word ID; and the Z-axis indicates the page ID.

The position of each record and the position of the field corresponding to each field in the CSV data 30 may also be indicated by the offset. Thus, the compression unit 110 generates a record index in which the position of each record is indicated by the offset, and stores the record index in the record index storage unit 130. The compression unit 110 also generates a column index in which the position of the field of each column is indicated by the offset, and stores the column index in the column index storage unit 140.

Figure 6:
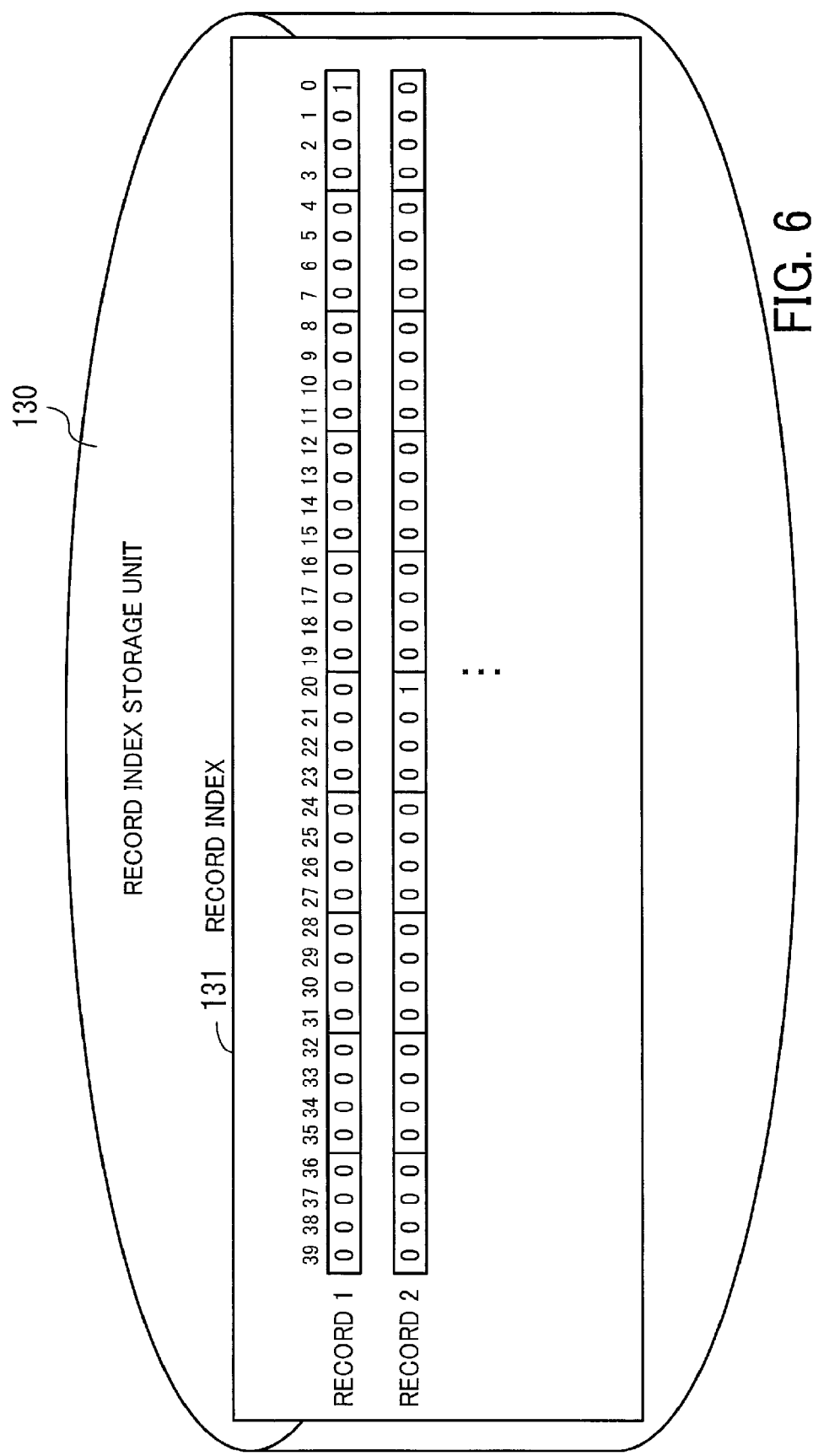
FIG. 6 illustrates an example of a record index.

FIG. 6 illustrates an example of a record index. A record index 131 stored in the record index storage unit 130 includes bit strings, one for each record, for example. In each bit string illustrated in FIG. 6, the bits are sequentially associated with offsets, starting with the rightmost (top) bit. In each bit string corresponding to a record, the value of the bit corresponding to the offset indicating the top position of the record is "1", and the values of the other bits are "0". For example, in "RECORD 1", the value of the bit of the offset "0" is "1". This indicates that "RECORD 1" is located in the position of the offset "0" in the CSV data 30.

Figure 7:
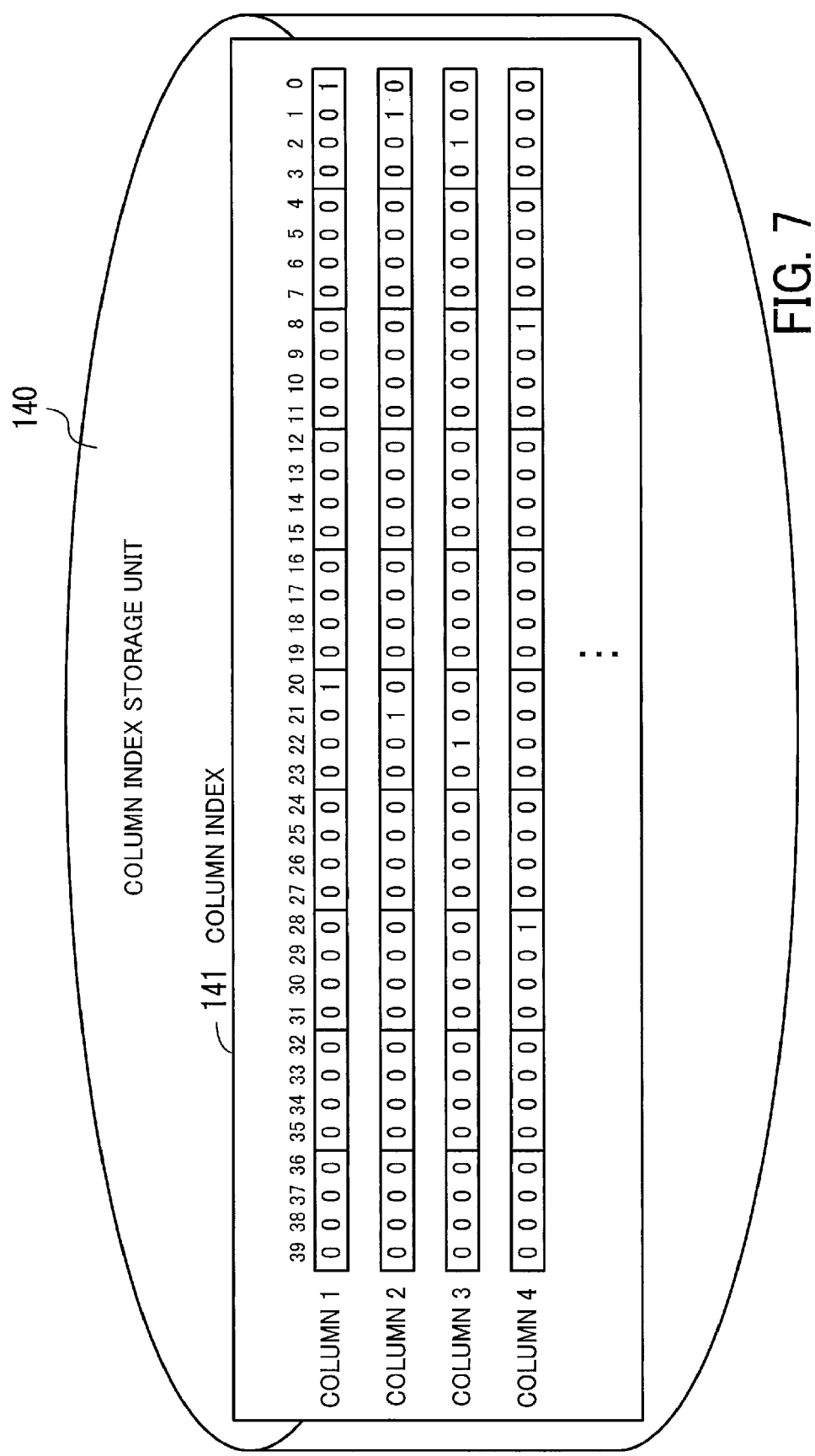
FIG. 7 illustrates an example of a column index.

FIG. 7 illustrates an example of a column index. A column index 141 stored in the column index storage unit 140 includes bit strings, one for each column, for example. In each bit string illustrated in FIG. 7, the bits are sequentially associated with offsets, starting with the rightmost (top) bit. In each bit string corresponding to a column, the value of the bit corresponding to the offset indicating the position of the field corresponding to the column is "1", and the values of the other bits are "0". For example, in "COLUMN 1", the values of the bit of the offset "0" and the bit of the offset "20" are "1". This indicates that the fields corresponding to "COLUMN 1" are located in the position of the offset "0" and the position of the offset "20" in the CSV data 30. The position of a field containing a plurality of words is indicated by the offset of the word at the top of the field, for example.

The column index 141 may be compressed and stored. For example, each bit string included in the column index 141 may be hashed with a predetermined algorithm to reduce the data amount.

In the following, the search authority stored in the search authority storage unit 150 will be described.

Figure 8:
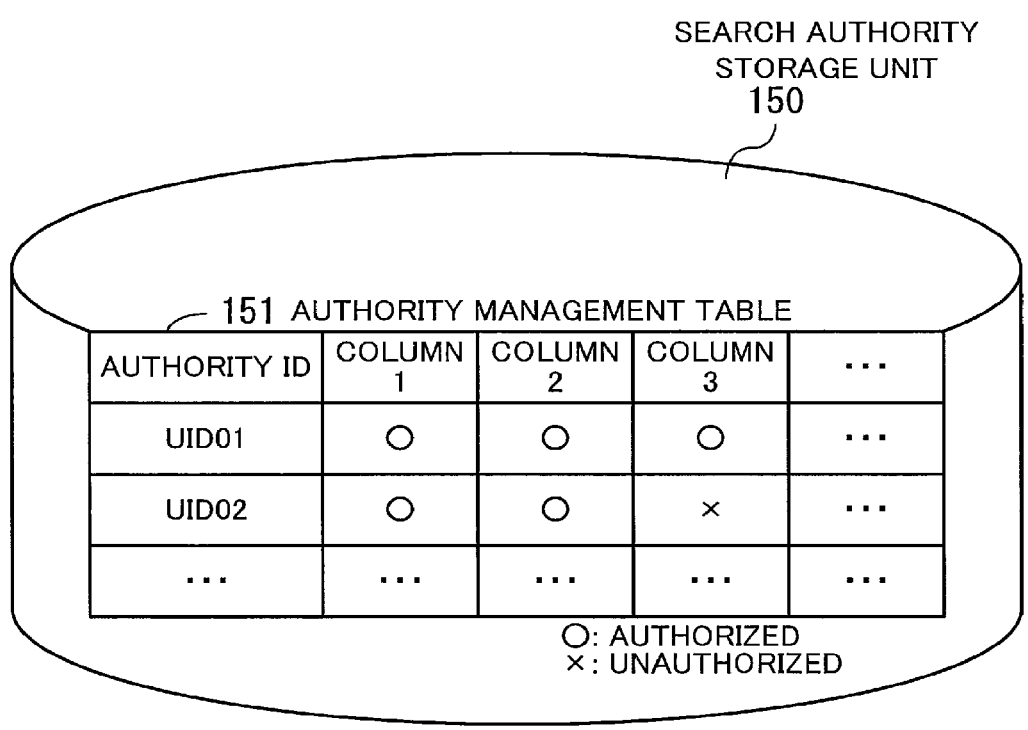
FIG. 8 illustrates an example of search authority.

FIG. 8 illustrates an example of search authority. The search authority storage unit 150 stores, for example, an authority management table 151. The authority management table 151 stores a flag indicating whether authority to search the column data in the fields corresponding to each column is given, in association with an authority ID. The authority ID is the user ID of the user whose search authority is managed. In the example of FIG. 8, a circle indicates that the user identified by the authority ID is authorized to search the column, and a cross indicates that the user is not authorized to search the column. For example, the user with the user ID "UID01" is authorized to search the column data in the fields corresponding to "COLUMN 3". Meanwhile, the user with the user ID "UID02" is not authorized to search the column data in the fields corresponding to "COLUMN 3".

The mask bit generation unit 160 refers to the authority management table 151 described above to generate a mask bit.

Figure 9:
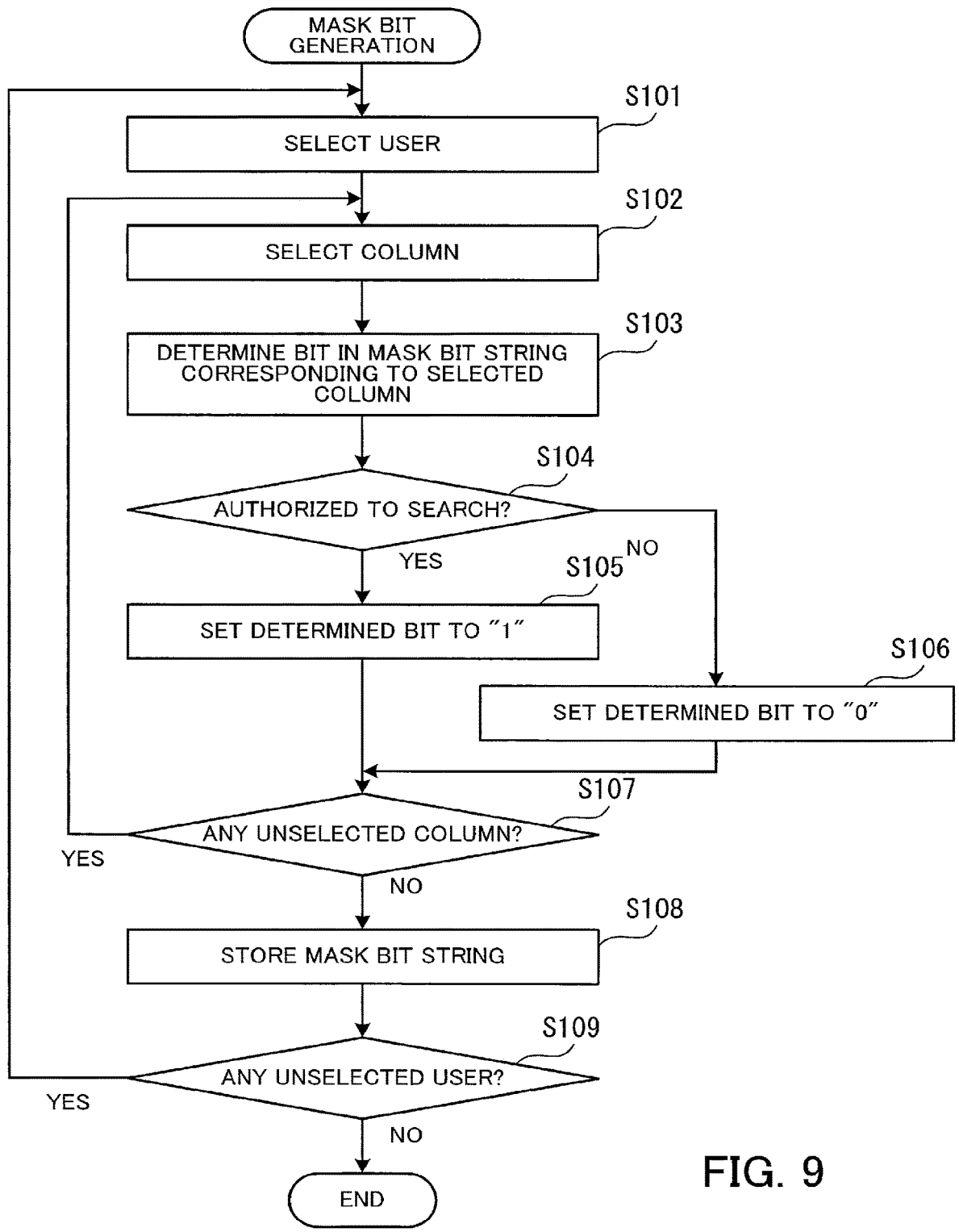
FIG. 9 is a flowchart illustrating an exemplary procedure of a mask bit generation process.

FIG. 9 is a flowchart illustrating an exemplary procedure of a mask bit generation process. In the following, the process illustrated in FIG. 9 will be described step by step.

(Step S101) The mask bit generation unit 160 selects an unselected user in the authority ID column in the authority management table 151. The mask bit generation unit 160 generates a mask bit string for the selected user. The generated mask bit string includes bits (mask bits) corresponding to the offsets of the respective words in the CSV data 30. The initial value of each mask bit in the generated mask bit string is, for example, "0".

(Step S102) The mask bit generation unit 160 selects a column.

(Step S103) The mask bit generation unit 160 refers to the column index 141, and determines the mask bit in the mask bit string corresponding to the selected column.

(Step S104) The mask bit generation unit 160 refers to the authority management table 151, and determines whether the selected user is authorized to search the column data in the fields corresponding to the selected column. If the user is authorized, the process proceeds to step S105. If the user is not authorized, the process proceeds to step S106.

(Step S105) The mask bit generation unit 160 sets the bit in the mask bit string determined in step S103 to "1". Then, the process proceeds to step S107.

(Step S106) The mask bit generation unit 160 sets the bit in the mask bit string determined in step S103 to "0". Note that if the initial value of each bit in the mask bit string is "0", the mask bit generation unit 160 does not change the value of the determined bit, and the process proceeds to step S107.

(Step S107) The mask bit generation unit 160 determines whether there is any unselected column. If there is any unselected column, the process returns to step S102. If there is no unselected column, the process proceeds to step S108.

(Step S108) The mask bit generation unit 160 stores the mask bit string of the selected user in the mask bit storage unit 170.

(Step S109) The mask bit generation unit 160 determines whether there is any unselected user. If there is any unselected user, the process returns to step S101. If there is no unselected user, the mask bit generation process ends.

In the manner described above, mask bit strings of the respective users are generated and stored in the mask bit storage unit 170.

Figure 10:
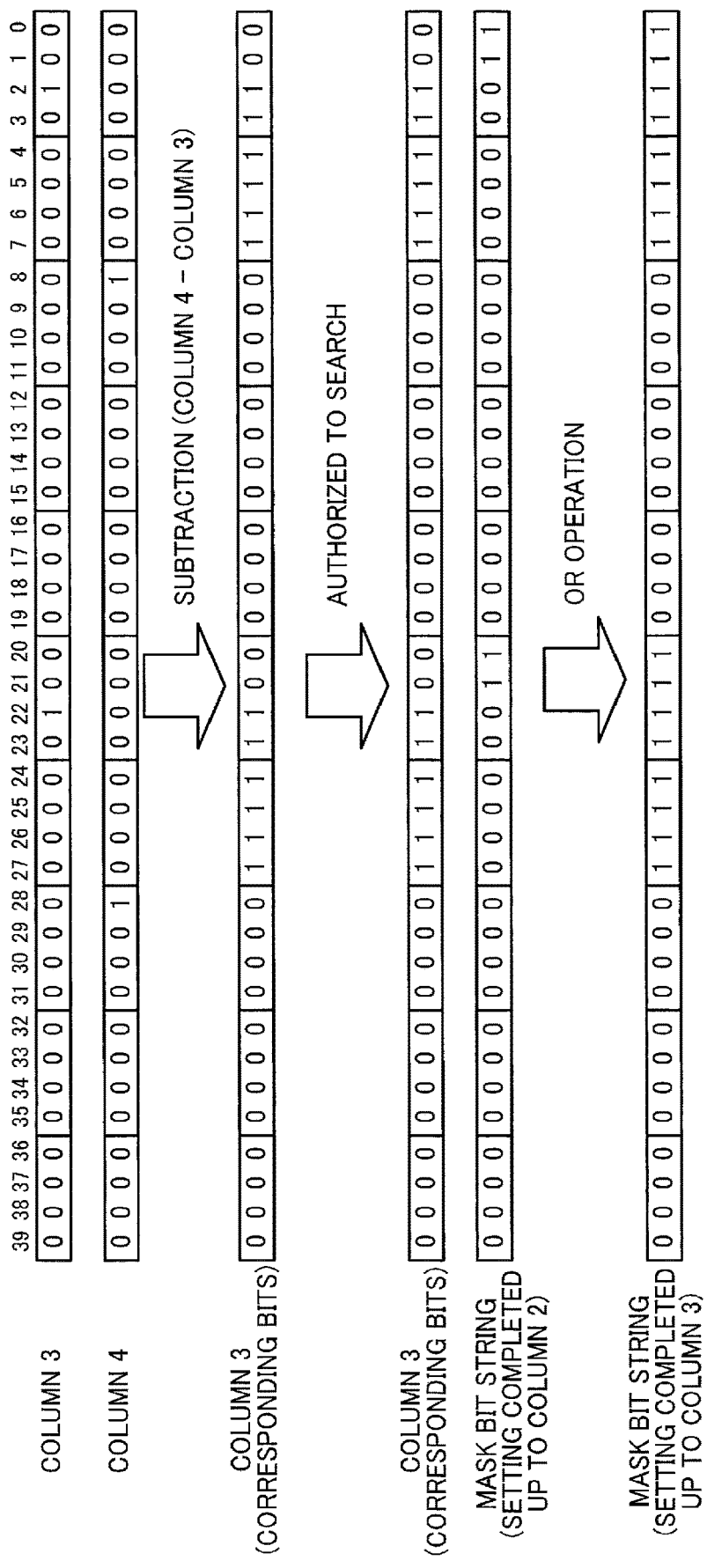
FIG. 10 illustrates an example of generating a mask bit string for each user.

FIG. 10 illustrates an example of generating a mask bit string for each user. In the example of FIG. 10, setting of mask bits is completed up to "COLUMN 2", and setting of the mask bits for "COLUMN 3" is to be performed. First, the mask bit generation unit 160 obtains the bit strings of "COLUMN 3" and "COLUMN 4", each indicating the positions of the corresponding fields, from the column index 141. Then, the mask bit generation unit 160 interprets the bit string of "COLUMN 4" and the bit string of "COLUMN 3" as binary values, and subtracts the value of "COLUMN 3" from the value of "COLUMN 4". The result of the subtraction is obtained as a bit string in which the position of each word or a number stored in the fields of "COLUMN 3" is indicated by a bit of "1".

If the user has the authority to search the column data in the fields corresponding to "COLUMN 3", the mask bit generation unit 160 performs a bitwise OR operation between the bit string indicating the bits corresponding to "COLUMN 3" and the mask bit string of the user. Thus, information indicating whether the search authority for "COLUMN 3" is given is set in the mask bit string.

Then, "COLUMN 4" is selected, and the mask bits of "COLUMN 3" are set. In the case where the user is not authorized to search the column data in the fields corresponding to "COLUMN 3", the process proceeds to processing for "COLUMN 4" without making any changes to the mask bit string.

The procedure described above is performed for all the columns, so that a mask bit string of the selected user is generated. The generated mask bit string is stored in the mask bit storage unit 170.

Figure 11:
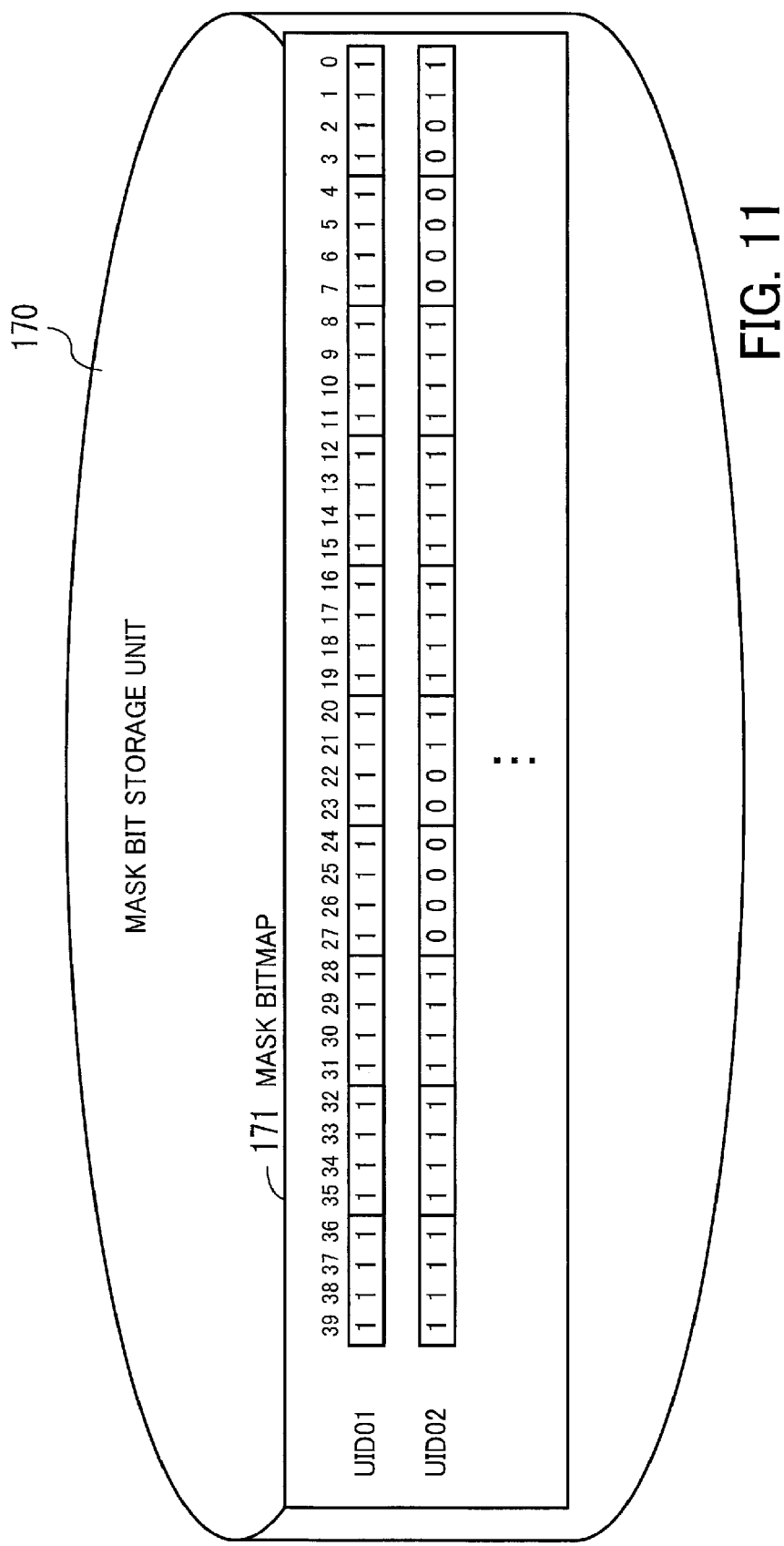
FIG. 11 illustrates an example of stored mask bit strings.

FIG. 11 illustrates an example of stored mask bit strings. The mask bit storage unit 170 stores a mask bitmap 171 including mask bit strings of the respective users. The mask bitmap 171 indicates which user is authorized to search which column.

Then, when the user enters a search query, a search is executed in accordance with the search authority, using the mask bit string of the user.

Figure 12:
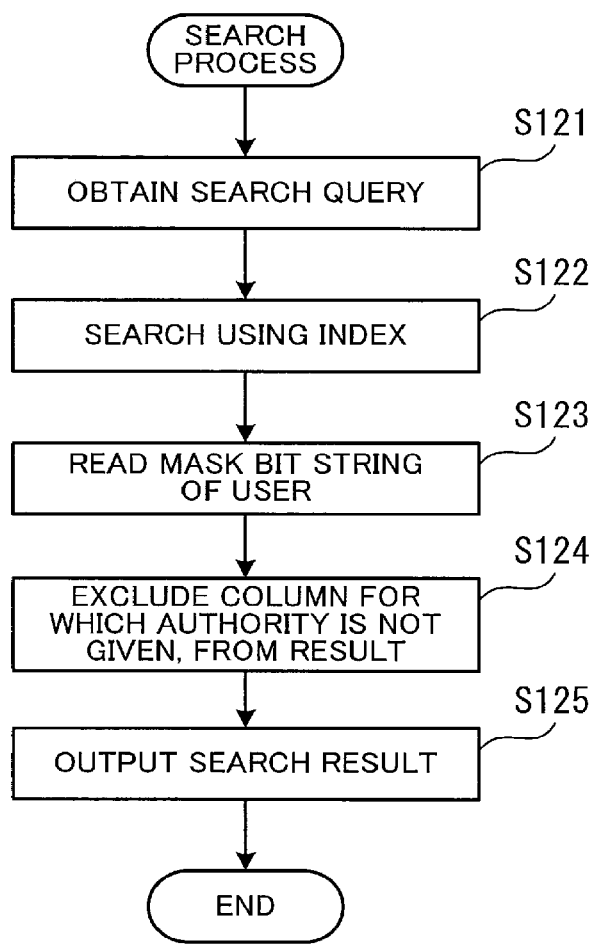
FIG. 12 is a flowchart illustrating an exemplary procedure of a search process.

FIG. 12 is a flowchart illustrating an exemplary procedure of a search process. In the following, the process illustrated in FIG. 12 will be described step by step.

(Step S121) The search unit 180 obtains a search query. For example, the search unit 180 obtains, as a search query, a search request entered by the user using a keyboard.

(Step S122) The search unit 180 determines whether information that matches the condition indicated by the search query is included in the original uncompressed business form, using the index 123 stored in the CSV compressed data storage unit 120. The result of this search is hereinafter referred to as an unrestricted search result.

(Step S123) The search unit 180 reads a mask bit string corresponding to the user who entered the search query, from the mask bit storage unit 170.

(Step S124) The search unit 180 excludes the column which the user is not authorized to search, from the intermediate search result, using the mask bit string. The result of this operation is hereinafter referred to as an authority-based search result.

(Step S125) The search unit 180 outputs, as the result of the search on the business form, the information of the record including a number or a character string indicated by the search query, based on the authority-based search result. For example, the search unit 180 refers to the record index 131 in the record index storage unit 130, and determines the record including a number or a character string that matches the search query, based on the authority-based search result. Then, the search unit 180 extracts the codes of the record from a code string in the CSV compressed data storage unit 120, and decodes the codes with use of a dictionary. Then, the search unit 180 displays the information included in the decoded record on a search result screen in a predetermined format.

In this manner, a search is performed in accordance with the search authority of the user. Note that the index 123 indicating the numbers and character strings contained in the business form to be searched is a bitmap-type inverted index. The use of a bitmap-type inverted index makes it easier to perform a full-text search on a business form.

Figure 13:
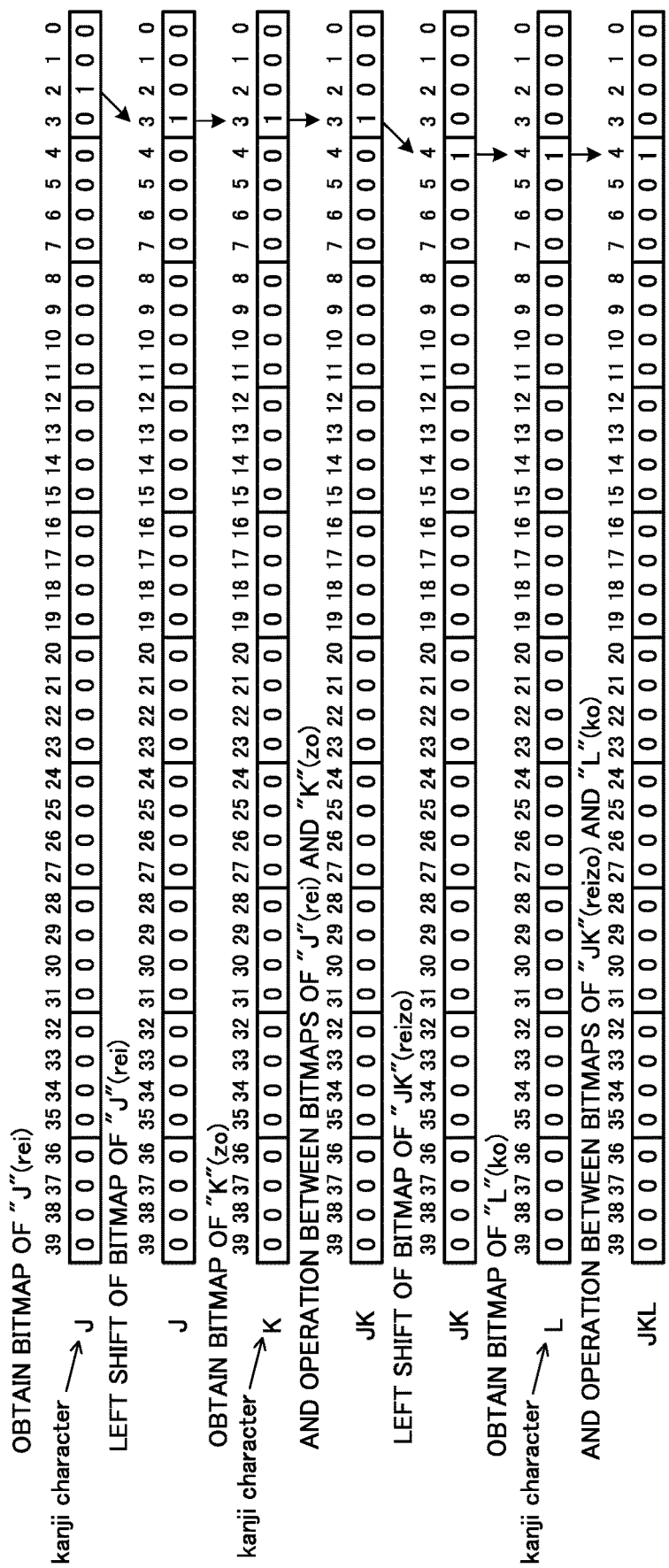
FIG. 13 illustrates an example of a search using a bitmap-type inverted index.

FIG. 13 illustrates an example of a search using a bitmap-type inverted index. More specifically, FIG. 13 illustrates an example of a full-text search using a keyword "冷蔵庫".

First, the search unit 180 obtains a bitmap corresponding to "冷", from the index 123. If the bitmap is hashed, the search unit 180 reconstructs the original bitmap from the hash.

Then, the search unit 180 shifts the values of the bitmap of "冷" to the left. In this step, the search unit 180 sets the top bit in the bitmap (the bit corresponding to the offset "0") to "0".

Then, the search unit 180 obtains a bitmap corresponding to "蔵" (zo), from the index 123. If the bitmap is hashed, the search unit 180 reconstructs the original bitmap from the hash.

Then, the search unit 180 performs a bitwise AND (logical AND) operation between the bitmap of "冷" and the bitmap of "蔵". Thus, a bitmap indicating the position of a character string "冷蔵" (reizo) is generated.

Then, the search unit 180 shifts the values of the bitmap of "冷蔵" to the left. In this step, the search unit 180 sets the top bit in the bitmap (the bit corresponding to the offset "0") to "0".

Then, the search unit 180 obtains a bitmap corresponding to "庫" (ko), from the index 123. If the bitmap is hashed, the search unit 180 reconstructs the original bitmap from the hash.

Finally, the search unit 180 performs a bitwise AND operation between the bitmap of "冷蔵" and the bitmap of "庫". Thus, a bitmap indicating the position of a character string "冷蔵庫" (reizoko) is generated. This bitmap is an intermediate search result.

The generated intermediate search result is modified in accordance with the search authority of the user to generate an authority-based search result.

Figure 14:
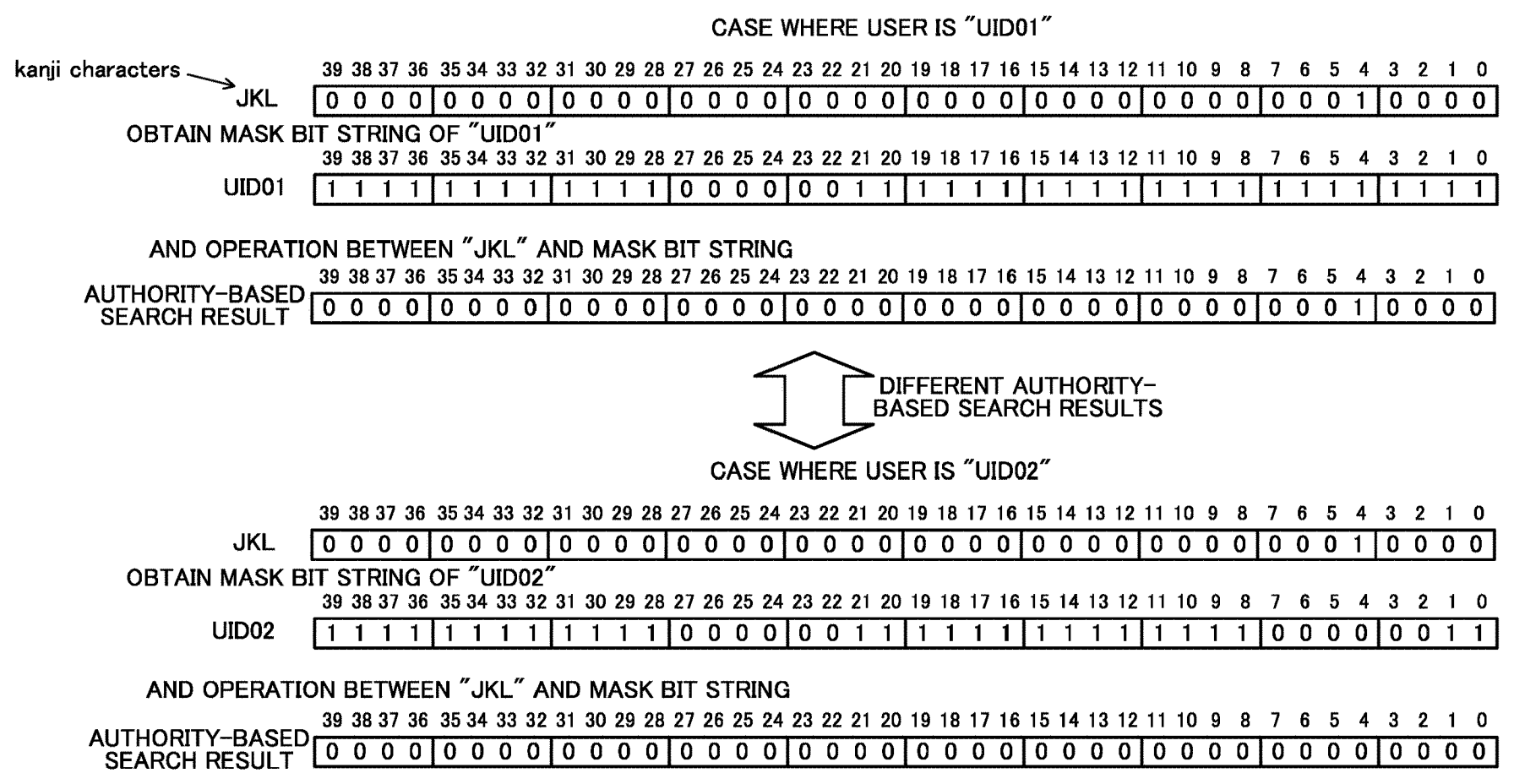

FIG. 14 illustrates an example of authority-based search results in accordance with search authority of users. The upper part of FIG. 14 illustrates the search result in the case where the user who entered a search query is "UID01", while the lower part illustrates the search result in the case where the user who entered a search query is "UID02". In this example, the search authority of each user is that illustrated in the authority management table 151 of FIG. 8. Accordingly, the bit strings of mask bits of the respective users are those illustrated in FIG. 11.

If the user "UID01" performs a search, a mask bit string corresponding to "UID01" is obtained. Then, a bitwise AND operation between the intermediate search result of "冷蔵庫" and the obtained mask bit string is performed to generate an authority-based search result. Since the user "UID01" is authorized to search all the columns, the intermediate search result of "冷蔵庫" is provided as the authority-based search result, with no changes made thereto.

If the user "UID02" performs a search, a mask bit string corresponding to "UID02" is obtained. Then, a bitwise AND operation between the intermediate search result of "冷蔵庫" and the obtained mask bit string is performed to generate an authority-based search result. The user "UID02" is not authorized to search "COLUMN 3". In the intermediate search result of "冷蔵庫", the value of the bit in the position corresponding to the field of "COLUMN 3" is "1", and the value of the mask bit in the corresponding position in the mask bit string is "0". Accordingly, in the authority-based search result, the values of all the bits are "0".

As described above, according to the second embodiment, it is possible to generate a search result in accordance with the search authority of each user for each column. As a result, it is possible to ensure the security of highly confidential information without impairing the convenience for the users with a high level of authority. Personal information used by companies includes highly confidential information such as addresses and My Numbers of employees. In the following, restrictions on searches on highly confidential information will be described in detail.

FIG. 15 illustrates an example of search authority. In an authority management table 151a illustrated in FIG. 15, the user ID of the user (manager) who is in a managerial position is "UID01", and the user ID of the user (employee A) who is an ordinary employee is "UID02". In the example of FIG. 15, the user acting as a manager is authorized to search all the columns. Meanwhile, the employee A is not authorized to search "COLUMN 3" storing addresses or "COLUMN 5" storing My Numbers.

Figure 16:
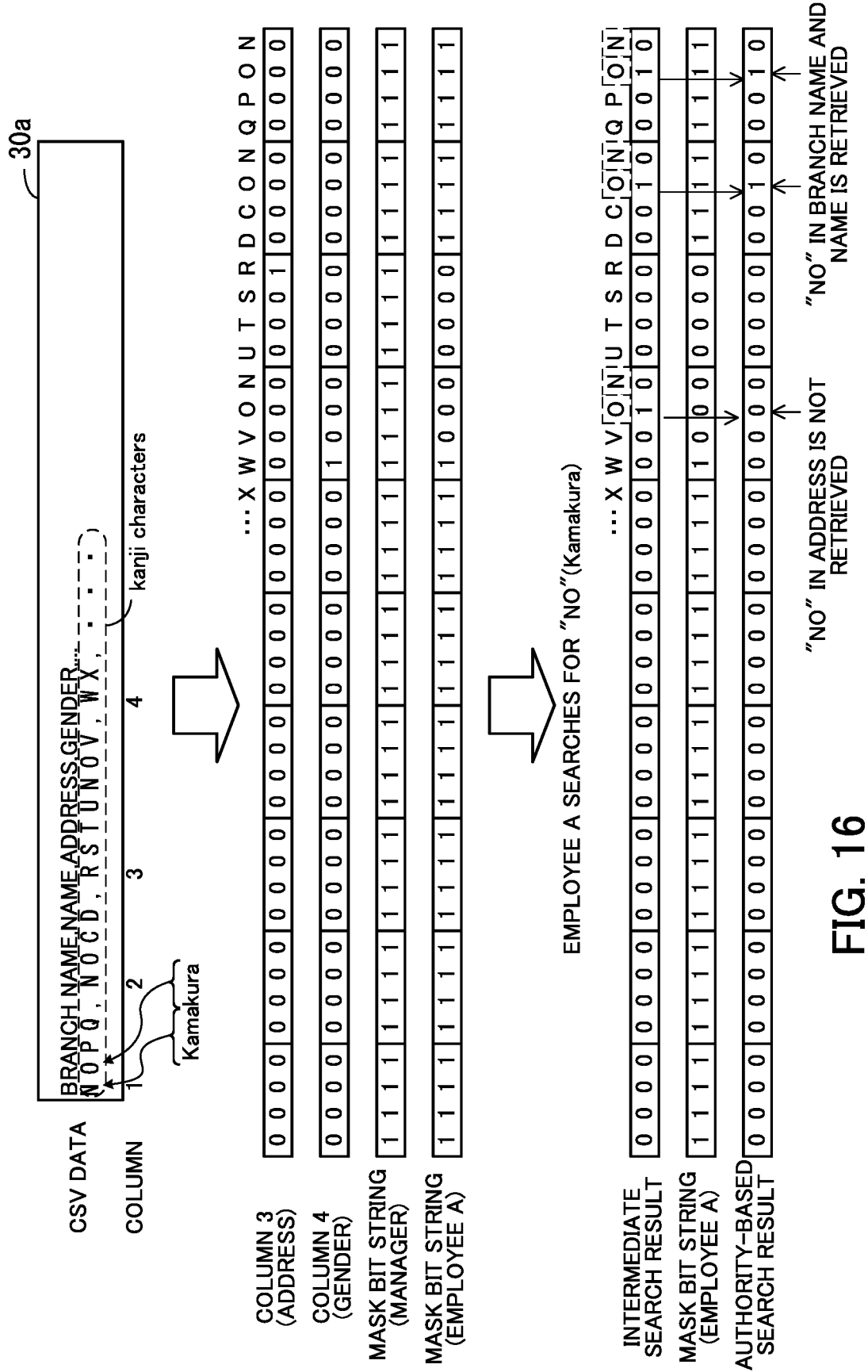
FIG. 16 illustrates an example of a search.

FIG. 16 illustrates an example of a search. CSV data 30a for a business form defines columns for the attributes such as branch name, name, address, gender, and so on. A record of each employee includes fields corresponding to the defined columns, and each of the fields stores personal information of the employee for the corresponding column.

When compressing the CSV data 30a described above, the column index 141 indicating the position of each column is generated. In FIG. 16, a bit string indicating the position of "COLUMN 3" and a bit string indicating the position of "COLUMN 4" of the generated column index 141 are illustrated.

Then, mask bit strings of the respective users are generated using the column index 141. In the mask bit string of the manager "UID01", the values of all the contained bits are "1". Meanwhile, in the mask bit string of the employee A, the value of the bit corresponding to the position of "COLUMN 3" for address is "0".

It is assumed here that the employee A performs a search with a keyword "鎌倉" (Kamakura). In the record at the top of the CSV data 30a, a character string "鎌倉" is included in each of the branch name, name, and address. Accordingly, in the intermediate search result, the bit corresponding to the position of "倉" (kura) of the character string is set to "1". The values of the other bits are "0".

Then, an AND operation is performed on the intermediate search result described above and the mask bit string of the employee A to generate an authority-based search result. In the authority-based search result, the value of the bit corresponding to "鎌倉" of the address is changed to "0". That is, although "鎌倉" of the branch name or name is retrieved by the search, "鎌倉" of the address is not retrieved. As a result, the confidentiality of the information on addresses is maintained.

Super-confidential information such as My Number is stored in encrypted form. However, in the case where the column for My Numbers is allowed to be searched, it is possible to find out the My Number of a specific person by entering a My Number as a search query, even if My Numbers are not displayed on the search result screen. In the second embodiment, it is possible to prevent My Numbers from being found out.

Figure 17:
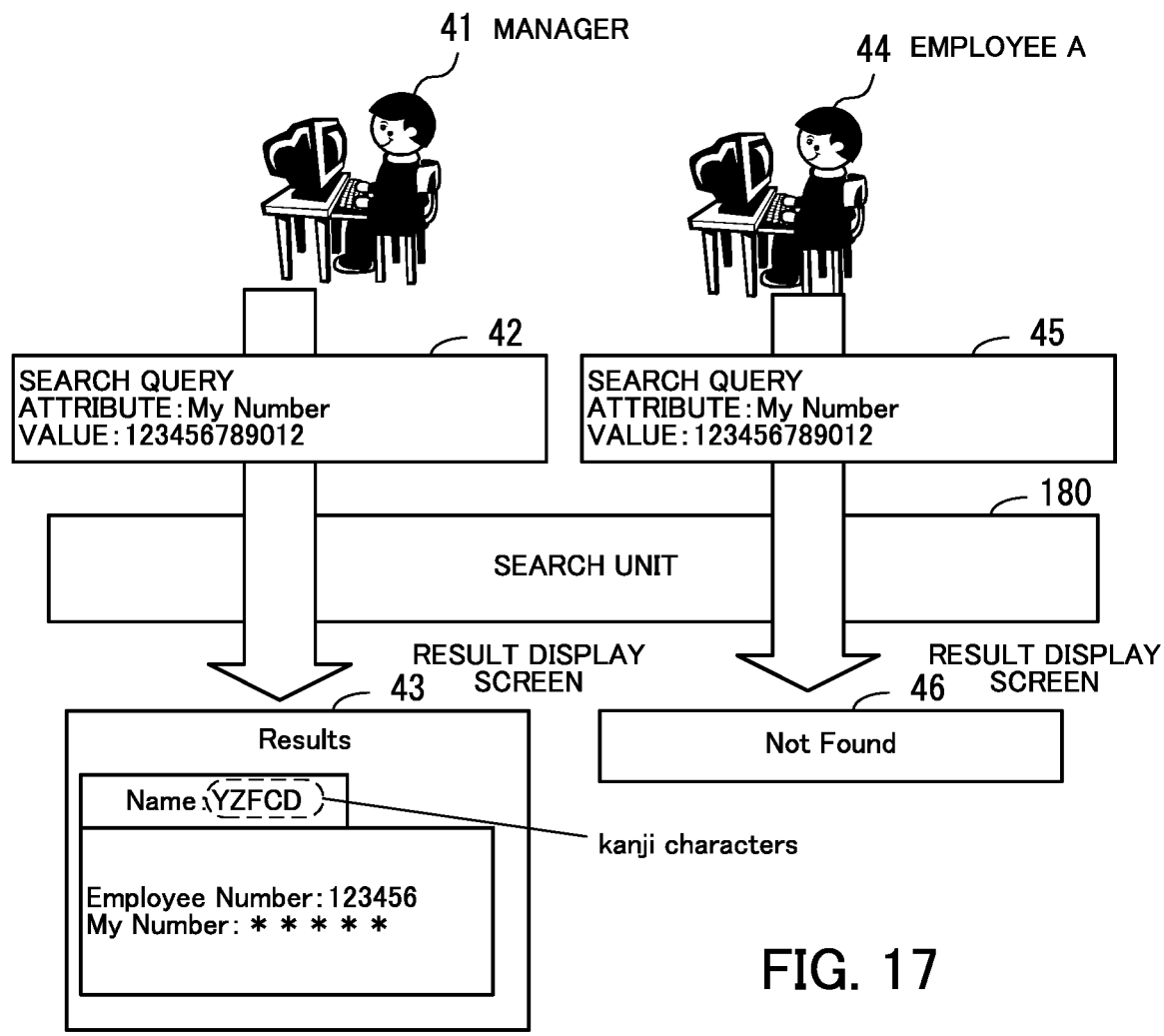
FIG. 17 illustrates an example of a search on My Numbers.

FIG. 17 illustrates an example of a search on My Numbers. Moore specifically, FIG. 17 illustrates an example in which a manager 41 and an employee A 44 perform a search using a My Number as a search keyword.

In a search query 42 entered by the manager 41, "My Number" is specified as the attribute to be searched, and a value of My Number is set as a search keyword. A search is performed based on the search query 42 by the search unit 180, and a result display screen 43 is displayed on the monitor 21. Since the manager 41 is authorized to search My Numbers, the result display screen displays the content of the record that includes the entered value of My Number. For example, the result display screen 43 displays the name and the employee number. The value of My Number is encrypted, and is hidden on the result display screen 43 unless decrypted.

On the result display screen 43, although the value of My Number is hidden, it is obvious that the value specified by the manager 41 in the search query is My Number of the person displayed on the result display screen 43. Since the manager 41 is authorized to search My Numbers, there is no problem in that the manager 41 is allowed to know My Number of the person.

Similarly, in a search query 45 entered by the employee A 44, "My Number" is specified as the attribute to be searched, and a value of My Number is set as a search keyword. A search is performed based on the search query 45 by the search unit 180, and a result display screen 46 is displayed on the monitor 21. Since the employee A 44 is not authorized to search My Numbers, the result display screen 46 displays information indicating that there is no matching person. Accordingly, the employee A will not know who has My Number specified in the search query 45.

In the manner described above, it is possible to allow the manager 41 to perform a search using My Number to provide a high level of convenience, while preventing the users with a low level of authority, such as the employee A, from performing a search using My Number.

(c) Third Embodiment

The following describes a third embodiment. In the third embodiment, it is possible to set search authority for a record, in accordance with the content of a specific column of the record. In the following description of the third embodiment, the differences from the second embodiment will be mainly discussed.

FIG. 18 illustrates an example of an authority management table according to the third embodiment. An authority management table 152 illustrated in FIG. 18 includes a column for column-content-based authority designation. The column for column-content-based authority designation stores the name of the column used for specifying the search authority, and the condition related to the value of the column. For example, it is assumed that the user "UID01" is an employee of 横浜支店 (Yokohama branch). With respect to this user, column-content-based designation "Branch name (COLUMN 1) is not 横浜支店", and column-content-based designation "Branch name (COLUMN 1) is 横浜支店" are set.

Further, with respect to each column-content-based authority designation, information is provided that indicates whether search authority is given for each column. In the example of FIG. 18, as for the records other than the records in which the branch name is "横浜支店", the user "UID01" is not authorized to search "COLUMN 2" storing names or "COLUMN 3" storing addresses. As for the records in which the branch name is "横浜支店" the user "UID01" is authorized to search "COLUMN 2" storing names and "COLUMN 3" storing addresses.

In the case where column-content-based search authority is set as described above, the mask bit generation unit 160 generates mask bits in accordance with the content of the column in each record.

Figure 19:
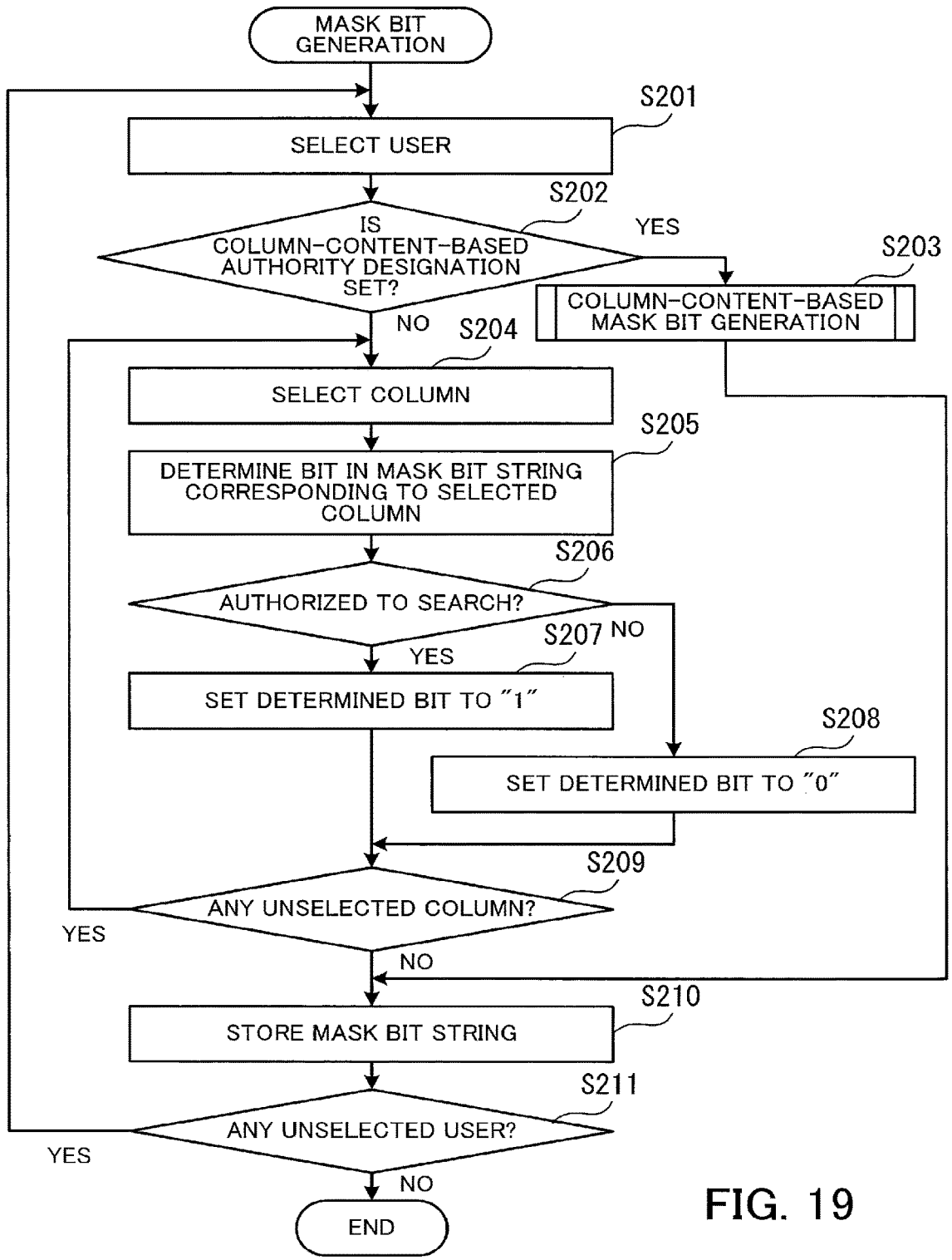
FIG. 19 is a flowchart illustrating an exemplary procedure of a mask bit generation process according to the third embodiment.

FIG. 19 is a flowchart illustrating an example of a mask bit generation process according to the third embodiment. In the process illustrated in FIG. 19, the operations of step S201 and steps S204 to S211 are the same as the operations of steps S101 to S109, respectively, of the mask bit generation process of the second embodiment illustrated in FIG. 9. The following will describe steps S202 and S203 which are the differences from the second embodiment.

(Step S202) The mask bit generation unit 160 refers to the authority management table 152, and determines whether column-content-based authority designation is set for the selected user. If column-content-based designation is set, the process proceeds to step S203. If column-content-based designation is not set, the process proceeds to step S204.

(Step S203) The mask bit generation unit 160 executes a column-content-based mask bit generation process. When this process ends, the process proceeds to step S210.

Figure 20:
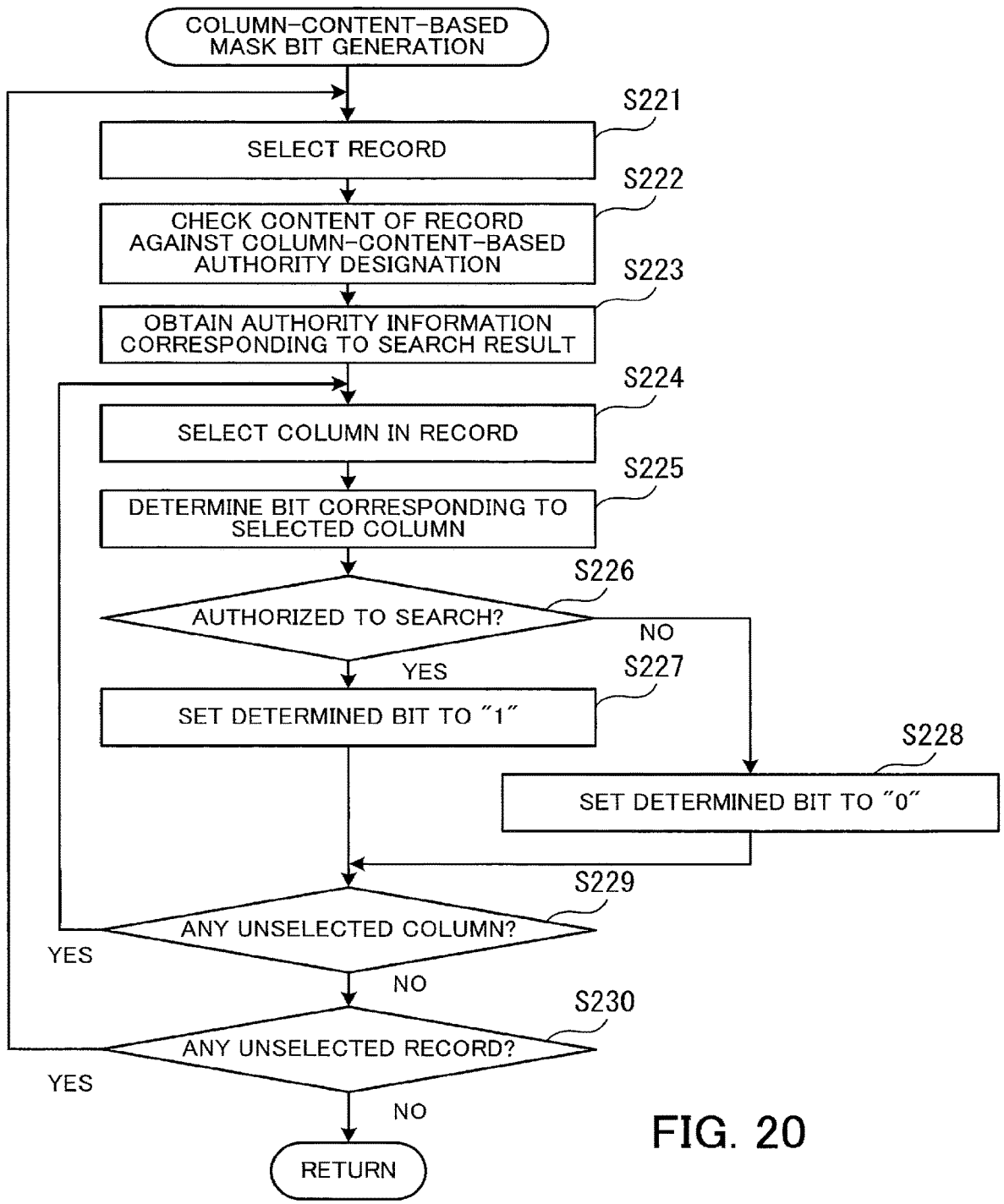
FIG. 20 is a flowchart illustrating an exemplary procedure of a column-content-based mask bit generation process.

FIG. 20 is a flowchart illustrating an exemplary procedure of a column-content-based mask bit generation process. In the following, the process illustrated in FIG. 20 will be described step by step.

(Step S221) The mask bit generation unit 160 selects a record in CSV data. For example, the mask bit generation unit 160 selects, one by one, each record indicated in the record index 131.

(Step S222) The mask bit generation unit 160 checks the content of the selected record against the column-content-based authority designation that is set for the selected user. For example, it is assumed that the user "UID01" illustrated in FIG. 18 is selected. In this case, the mask bit generation unit 160 searches "COLUMN 1" of the selected record to find a character string "横浜" (Yokohama). If a character string "横浜" is found, search authority corresponding to the column-content-based authority designation "Branch name (COLUMN 1) is 横浜支店" is applied. If a character string "横浜" is not found, search authority corresponding to the column-content-based authority designation "Branch name (COLUMN 1) is not 横浜支店" is applied.

(Step S223) The mask bit generation unit 160 obtains the search authority corresponding to the column-content-based authority designation from the authority management table 152.

(Step S224) The mask bit generation unit 160 selects a column in the selected record.

(Step S225) The mask bit generation unit 160 refers to the record index 131 and the column index 141, and determines the mask bit in the mask bit string corresponding to the selected column in the selected record.

(Step S226) The mask bit generation unit 160 determines whether the selected user is authorized to search the column data in the fields corresponding to the selected column, based on the search authority obtained in step S223. If the user is authorized, the process proceeds to step S227. If the user is not authorized, the process proceeds to step S228.

(Step S227) The mask bit generation unit 160 sets the bit in the mask bit string determined in step S225 to "1". Then, the process proceeds to step S229.

(Step S228) The mask bit generation unit 160 sets the bit in the mask bit string determined in step S225 to "0". Note that if the initial value of each bit in the mask bit string is "0", the mask bit generation unit 160 does not change the value of the determined bit, and the process proceeds to step S229.

(Step S229) The mask bit generation unit 160 determines whether there is any unselected column in the selected record. If there is any unselected column, the process returns to step S224. If there is no unselected column, the process proceeds to step S230.

(Step S230) The mask bit generation unit 160 determines whether there is any unselected record. If there is any unselected record, the process returns to step S221. If there is no unselected record, the column-content-based mask bit generation process ends.

In this manner, in the third embodiment, search authority is applied to each record, in accordance with the content of a specific column in that record. This allows more detailed designation of the search authority.

In the case where column-content-based search authority designation is applied, the content of a record is checked against the column-content-based search authority designation as in step S222. In the following, the method of checking the content of a record against column-content-based search authority designation will be described in detail with reference to FIG. 21.

Figure 21:
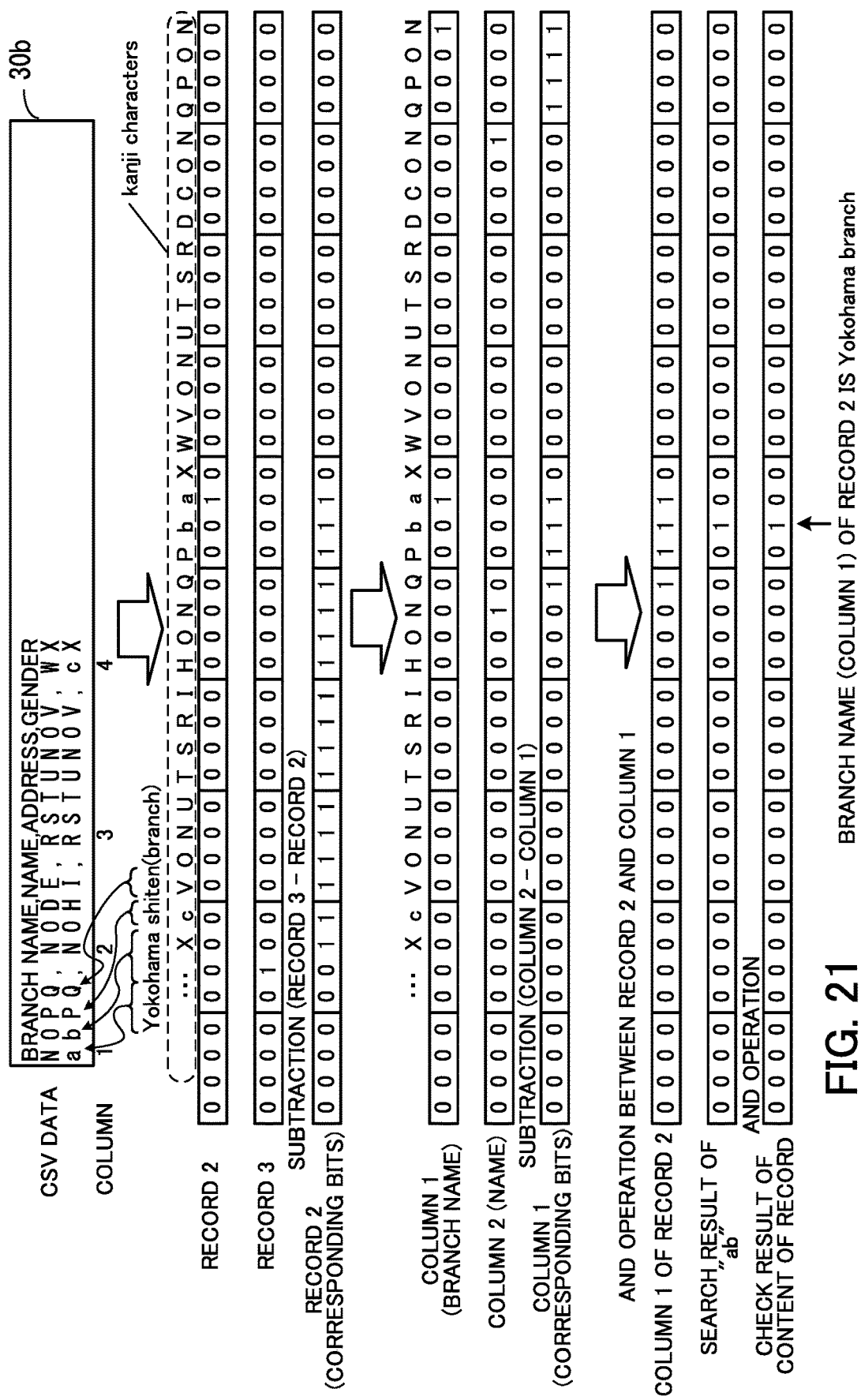
FIG. 21 illustrates an example of checking the content of a record against column-content-based authority designation.

FIG. 21 illustrates an example of checking the content of a record against column-content-based authority designation. In the example of FIG. 21, CSV data 30b includes a plurality of records each including fields corresponding to the columns for branch name, name, address, and gender. The following describes an example of setting mask bits corresponding to "RECORD 2".

The mask bit generation unit 160 first extracts the bit string indicating the position of the "RECORD 2" and the bit string indicating the position of "RECORD 3" from the record index 131. Then, the mask bit generation unit 160 interprets each bit string as a binary value, and subtracts "RECORD 2" from "RECORD 3". As a result of the subtraction, a bit string is generated in which the bits in the positions of numbers or characters included in "RECORD 2" are set to "1".

Further, the mask bit generation unit 160 first extracts the bit string indicating the position of the "COLUMN 1" and the bit string indicating the position of "COLUMN 2" from the column index 141. Then, the mask bit generation unit 160 interprets each bit string as a binary value, and subtracts "COLUMN 1" from "COLUMN 2". As a result of the subtraction, a bit string is generated in which the bits in the positions of numbers or characters included in the field corresponding to "COLUMN 1" are set to "1".

Then, the mask bit generation unit 160 performs a bitwise AND operation between the bit string indicating the bits corresponding to "RECORD 2" and the bit string indicating the bits corresponding to "COLUMN 1". Thus, a bit string indicating the bits corresponding to "COLUMN 1" of "RECORD 2" is generated. The mask bit generation unit 160 performs an AND operation between this bit string and the search result of "横浜". The result of this AND operation is the check result of the content of the record. That is, if at least one bit is set to "1", this indicates that "COLUMN 1" of "RECORD 2" includes a character string "横浜". That is, "RECORD 2" is a record related to a person working at "横浜支店", so that the search authority for the case of "Branch name (COLUMN 1) is 横浜支店" is applied.

In this manner, search authority to be applied is determined for each record. Then, the mask bits of each record are determined in accordance with the applied search authority.

Figure 22:
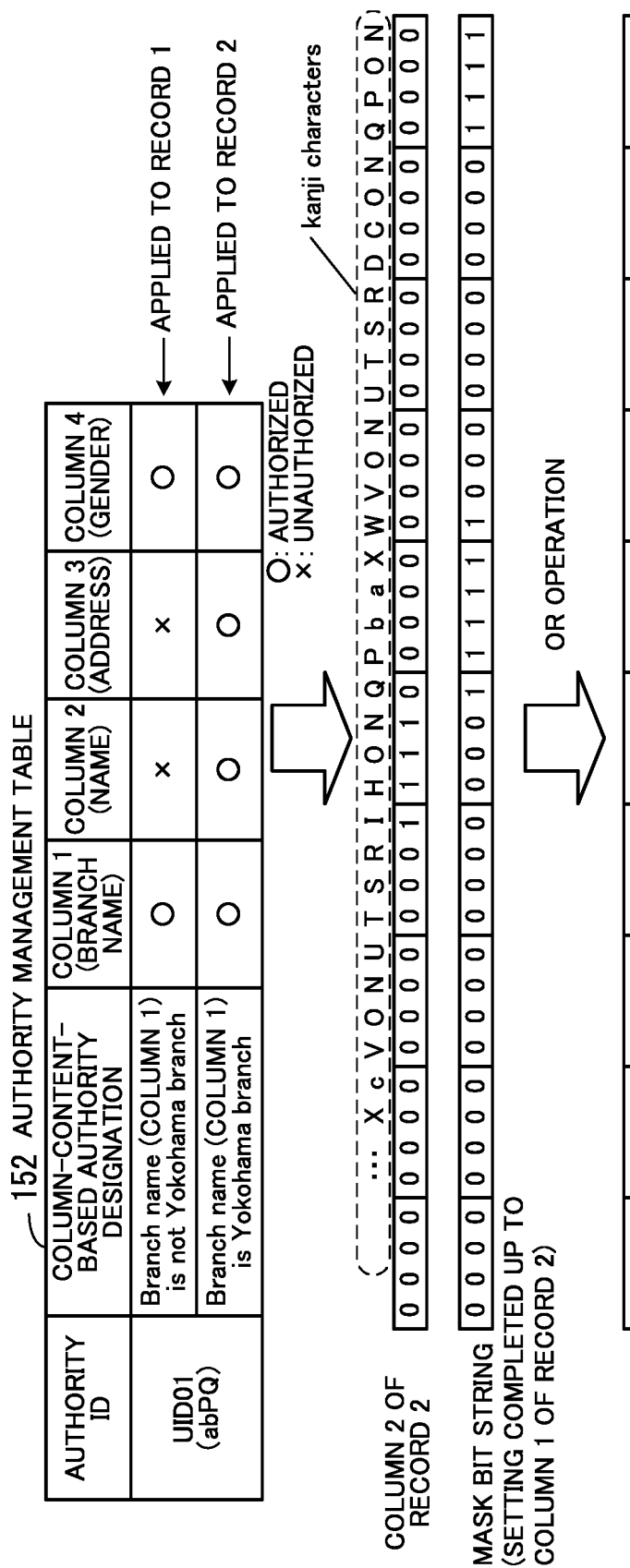
FIG. 22 illustrates an example of setting mask bits in accordance with the content of a column.

FIG. 22 illustrates an example of setting mask bits in accordance with the content of a column. In the example of FIG. 22, the search authority for the case where "Branch name (COLUMN 1) is not 横浜支店" is applied to "RECORD 1", meanwhile the search authority for the case where "Branch name (COLUMN 1) 横浜支店" is applied to "RECORD 2". It is assumed that setting of mask bits is completed up to "COLUMN 1" of "RECORD 2", and setting of mask bits for "COLUMN 2" of "RECORD 2" is performed next.

The mask bit generation unit 160 generates a bit string indicating the positions of numbers or characters included in "COLUMN 2" of "RECORD 2". This bit string is generated using the same method as the method of FIG. 21 used for generating the bit string indicating the positions of numbers or characters included in "COLUMN 1" of "RECORD 2".

The mask bit generation unit 160 refers to the authority for "COLUMN 2" specified in the search authority applied to "RECORD 2", and determines that authority is given. Then, the mask bit generation unit 160 performs an OR operation between a mask bit string in which setting of mask bits is completed up to "COLUMN 1" of "RECORD 2" and a bit string indicating the positions of numbers or characters included in "COLUMN 2" of "RECORD 2". Thus, the bits corresponding to "COLUMN 2" of "RECORD 2" in the mask bit string are set to "1".

In the manner described above, the mask bits are sequentially set, so that the mask bit string for the user "UID01" is completed. Thus, when the user "UID01" performs a search, the search is executed using the mask bit string for the user "UID01".

Figure 23:
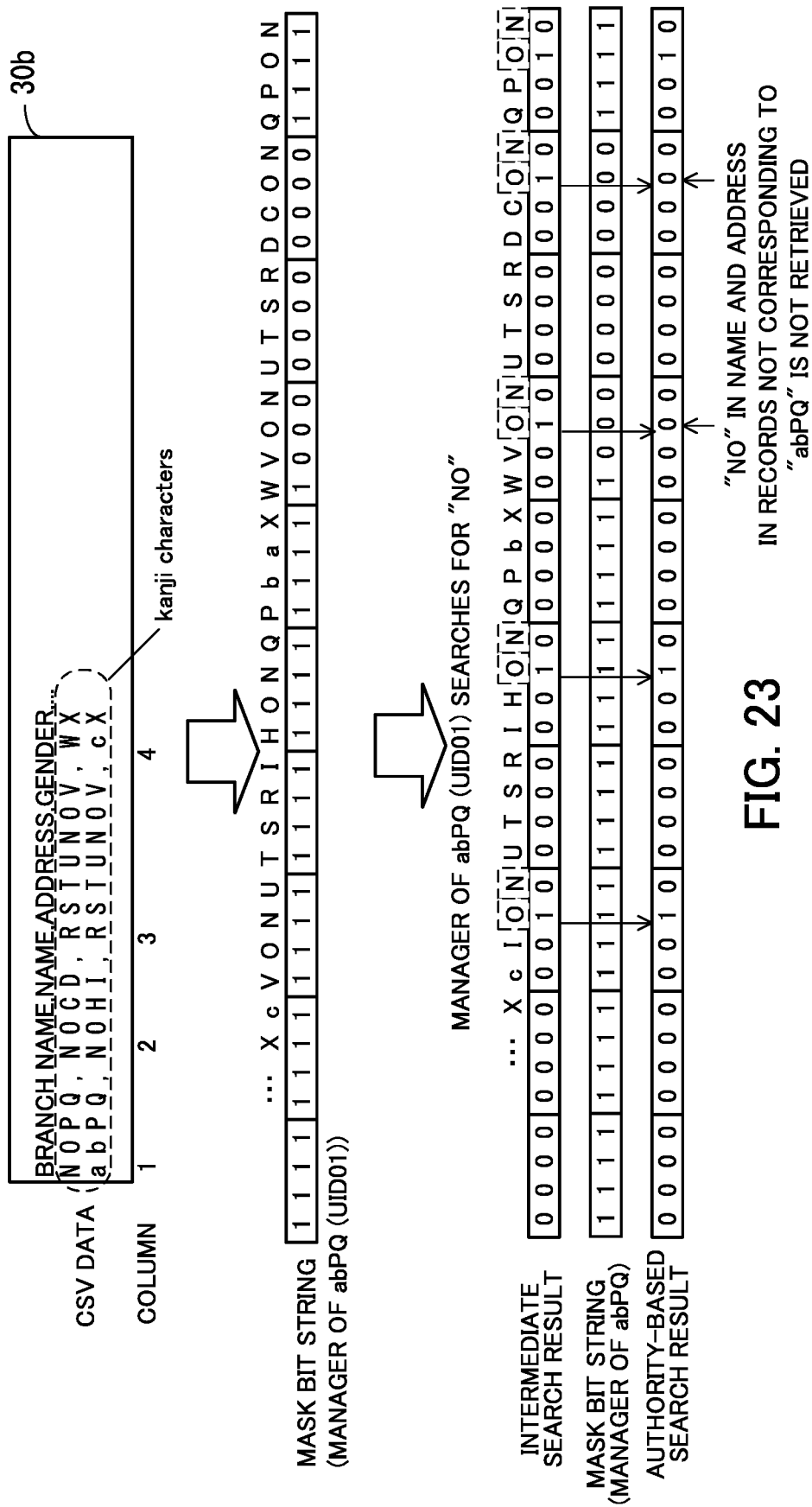
FIG. 23 illustrates an example of a search with column-content-based authority designation.

FIG. 23 illustrates an example of a search with column-content-based authority designation. In FIG. 23, it is assumed that a keyword "鎌倉" is specified in a search query by the user "UID01" who is the manager of 横浜支店. In this case, first, the keyword "鎌倉" is searched for, so that an intermediate search result without restriction by search authority is obtained. An AND operation is performed between the intermediate search result and the mask bit string corresponding to "UID01", so that the operation result is output as an authority-based search result.

In the example of FIG. 23, "鎌倉" included in the fields of "COLUMN 2 (NAME)" and "COLUMN 3 (ADDRESS)" of "RECORD 1" not corresponding to 横浜支店 is not retrieved by the search. Meanwhile, "鎌倉" included in the fields of "COLUMN 2 (NAME)" and "COLUMN 3 (ADDRESS)" of "RECORD 2" corresponding to 横浜支店 is retrieved by the search.

In the manner described above, it is possible to set search authority in accordance with the content of a column of each record. Accordingly, it is possible to specify an allowable search range in each record, in accordance with the relationship between the user performing a search and the person indicated in the record (in accordance with whether the user works at the same branch as the person), for example. Even in this case, since only one mask bit string needs to be generated for each user, processing load of the search is not increased. It is therefore possible to efficiently perform a search that involves detailed control of search authority.

(d) Fourth Embodiment

The following describes a fourth embodiment. In the fourth embodiment, the entire record that includes a specific character string is excluded from the search. In the following description of the fourth embodiment, the differences from the second embodiment will be mainly discussed.

FIG. 24 illustrates an example of an authority management table according to the fourth embodiment. An authority management table 153 illustrated in FIG. 24 includes a column for excluded record designation. The column for excluded record designation stores conditions related to a number or a character included in a record to be excluded from the search. For example, with respect to the user "UID01", the column stores a condition indicating that records including "鎌倉" are excluded from the search.

In the case where excluded record designation is set as described above, the mask bit generation unit 160 generates mask bits for each record in accordance with whether the record is excluded from the search.

Figure 25:
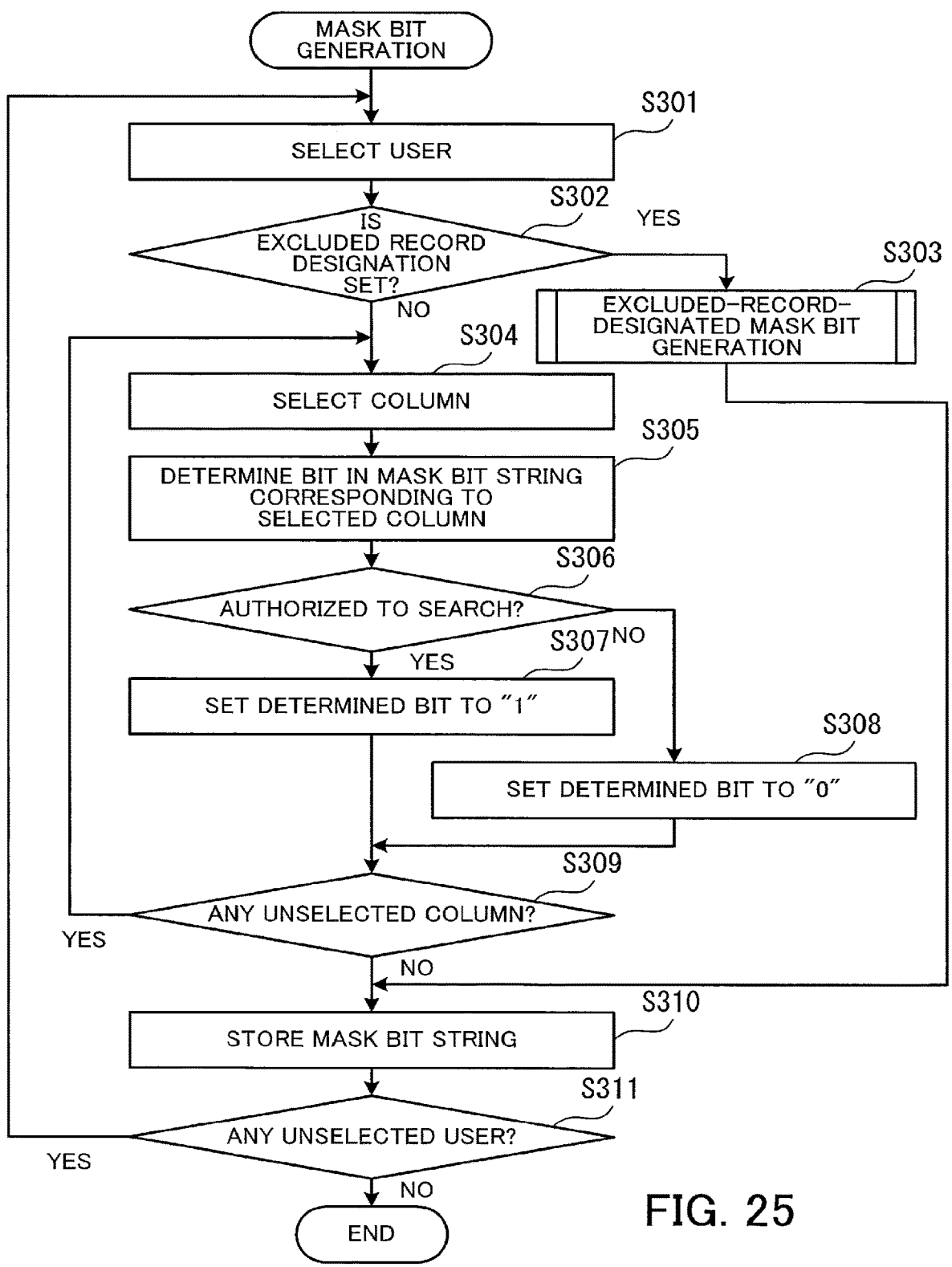
FIG. 25 is a flowchart illustrating an exemplary procedure of a mask bit generation process according to the fourth embodiment.

FIG. 25 is a flowchart illustrating an example of a mask bit generation process according to the fourth embodiment. In the process illustrated in FIG. 25, the operations of step S301 and steps S304 to S311 are the same as the operations of steps S101 to S109, respectively, of the mask bit generation process of the second embodiment illustrated in FIG. 9. The following will describe steps S302 and S303 which are the differences from the second embodiment.

(Step S302) The mask bit generation unit 160 refers to the authority management table 152, and determines whether excluded record designation is set for the selected user. If excluded record designation is set, the process proceeds to step S303. If excluded record designation is not set, the process proceeds to step S304.

(Step S303) The mask bit generation unit 160 executes an excluded-record-designated mask bit generation process. When this process ends, the process proceeds to step S310.

Figure 26:
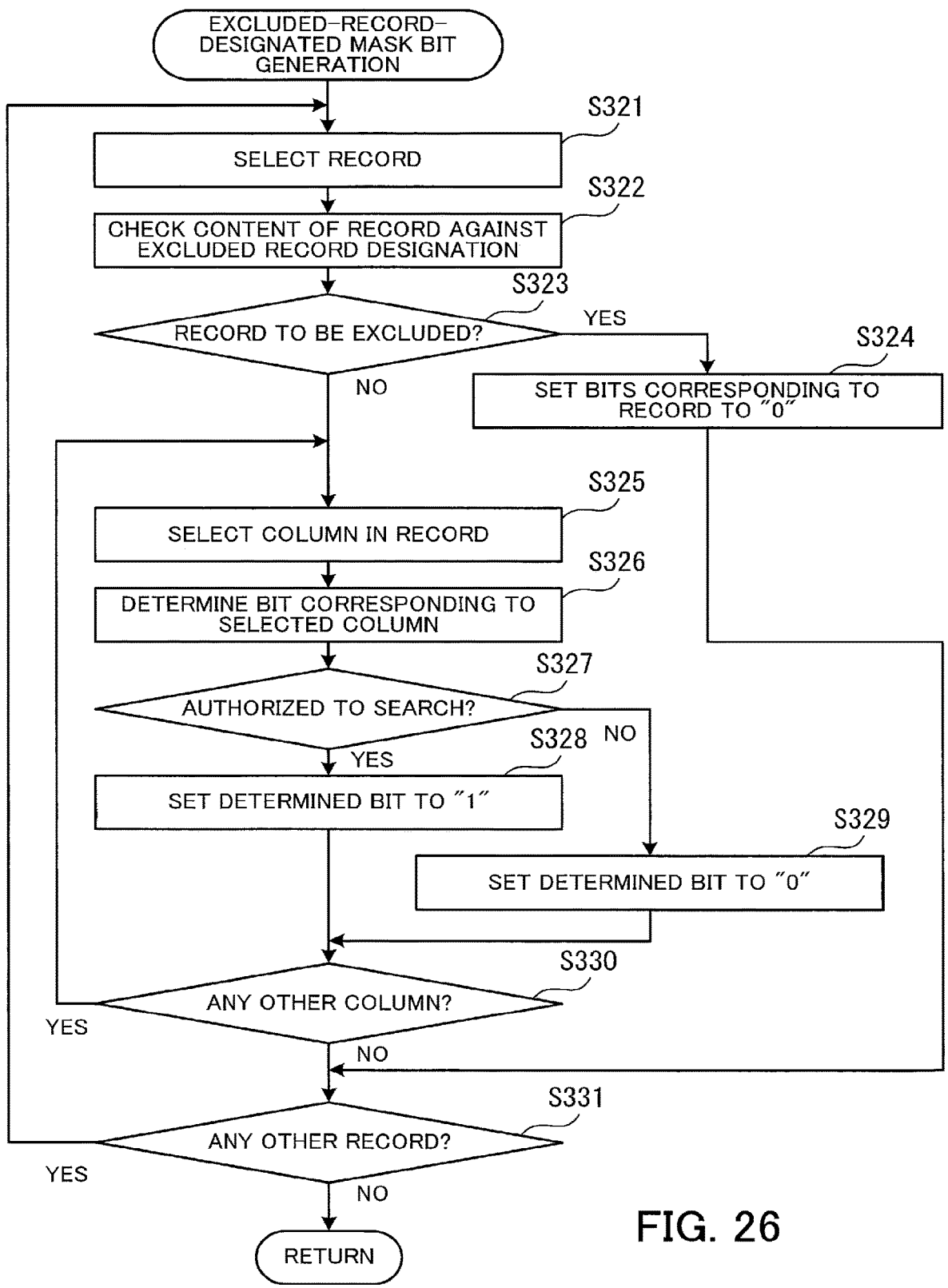
FIG. 26 is a flowchart illustrating an exemplary procedure of an excluded-record-designated mask bit generation process.

FIG. 26 is a flowchart illustrating an exemplary procedure of an excluded-record-designated mask bit generation process. In the following, the process illustrated in FIG. 26 will be described step by step.

(Step S321) The mask bit generation unit 160 selects a record in CSV data. For example, the mask bit generation unit 160 selects, one by one, each record indicated in the record index 131.

(Step S322) The mask bit generation unit 160 checks the content of the selected record against the excluded record designation that is set for the selected user. For example, it is assumed that the user "UID01" illustrated in FIG. 24 is selected. In this case, the mask bit generation unit 160 searches all the columns of the selected record to find a character string "鎌倉". If a character string "鎌倉" is found, the selected record is a record to be excluded from the search. If a character string "鎌倉" is not found, the selected record is a search target.

(Step S323) If the mask bit generation unit 160 determines that the selected record is a record to be excluded from the search, the process proceeds to step S324. If the mask bit generation unit 160 determines that the selected record is a search target, the process proceeds to step S325.

(Step S324) The mask bit generation unit 160 sets the bits of the mask bits corresponding to the selected record to "0". Then, the process proceeds to step S331. Note that if the initial value of each bit of the mask bits is "0", the mask bit generation unit 160 does not change the values of the determined bits, and the process proceeds to step S331.

(Step S325) The mask bit generation unit 160 selects a column in the selected record.

(Step S326) The mask bit generation unit 160 refers to the record index 131 and the column index 141, and determines the mask bit in the mask bit string corresponding to the selected column in the selected record.

(Step S327) The mask bit generation unit 160 determines whether the selected user is authorized to search the column data in the fields corresponding to the selected column, based on the search authority of the selected user. If the user is authorized, the process proceeds to step S328. If the user is not authorized, the process proceeds to step S329.

(Step S328) The mask bit generation unit 160 sets the bit in the mask bit string determined in step S326 to "1". Then, the process proceeds to step S330.

(Step S329) The mask bit generation unit 160 sets the bit in the mask bit string determined in step S326 to "0". Note that if the initial value of each bit in the mask bit string is "0", the mask bit generation unit 160 does not change the value of the determined bit, and the process proceeds to step S330.

(Step S330) The mask bit generation unit 160 determines whether there is any unselected column in the selected record. If there is any unselected column, the process returns to step S325. If there is no unselected column, the process proceeds to step S331.

(Step S331) The mask bit generation unit 160 determines whether there is any unselected record. If there is any unselected record, the process returns to step S321. If there is no unselected record, the excluded-file-designated mask bit generation process ends.

In the manner described above, in the fourth embodiment, mask bits are generated to prevent a search on the records that are designated to be excluded from the search. This allows more detailed designation of the search authority.

Figure 27:
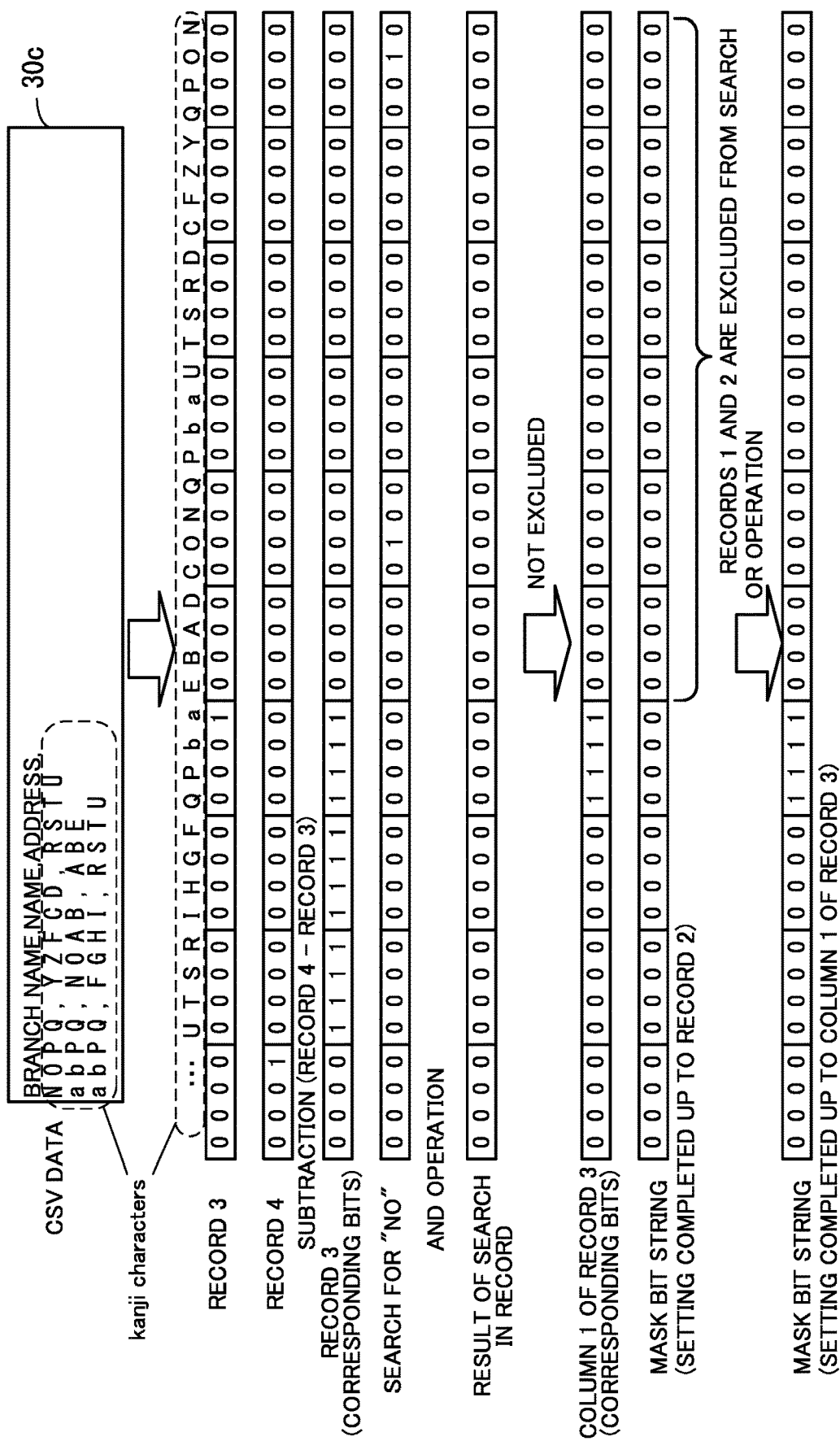
FIG. 27 illustrates an example of mask bit generation with excluded record designation.

FIG. 27 illustrates an example of mask bit generation with excluded record designation. In CSV data 30c illustrated in the example of FIG. 27, the column for branch name in the first record "RECORD 1" includes the characters "鎌倉". Also, the column for name in the second record "RECORD 2" includes the characters "鎌倉". It is assumed here that a mask bit string of the user "UID01" is generated based on the authority management table 153 illustrated in FIG. 24. It is further assumed that setting of mask bits corresponding to "RECORD 1" and "RECORD 2" is completed, and setting of mask bits for "COLUMN 1" of "RECORD 3" is performed next.

The mask bit generation unit 160 first extracts the bit string indicating the position of the "RECORD 3" and the bit string indicating the position of "RECORD 4" from the record index 131. Then, the mask bit generation unit 160 interprets each bit string as a binary value, and subtracts "RECORD 3" from "RECORD 4". As a result of the subtraction, a bit string is generated in which the bits in the positions of numbers or characters included in "RECORD 3" are set to "1". The mask bit generation unit 160 performs an AND operation between this bit string and the search result of "鎌倉". The result of this AND operation is the result of a search for "鎌倉" in "RECORD 3". That is, if at least one bit is set to "1", this indicates that "RECORD 3" includes a character string "鎌倉". In the example of FIG. 27, "RECORD 3" does not include a character string "鎌倉". Accordingly, "RECORD 3" is determined to be a search target.

Thus, the mask bit generation unit 160 generates a bit string indicating the positions of numbers or characters included in "COLUMN 1" of "RECORD 3". This bit string is generated using the same method as the method of FIG. 21 used for generating the bit string indicating the positions of numbers or characters included in "COLUMN 1" of "RECORD 2". The mask bit generation unit 160 refers to the authority for "COLUMN 1" specified in the search authority applied to the user "UID01", and determines that authority is given. Then, the mask bit generation unit 160 performs an OR operation between a mask bit string in which setting of mask bits is completed up to "RECORD 2" and a bit string indicating the positions of numbers or characters included in "COLUMN 1" of "RECORD 3". Thus, the bits corresponding to "COLUMN 1" of "RECORD 3" in the mask bit string are set to "1".

In the manner described above, the mask bits are sequentially set, so that the mask bit string for the user "UID01" is completed. Thus, when the user "UID01" performs a search, the search is executed using the mask bit string for the user "UID01".

Figure 28:
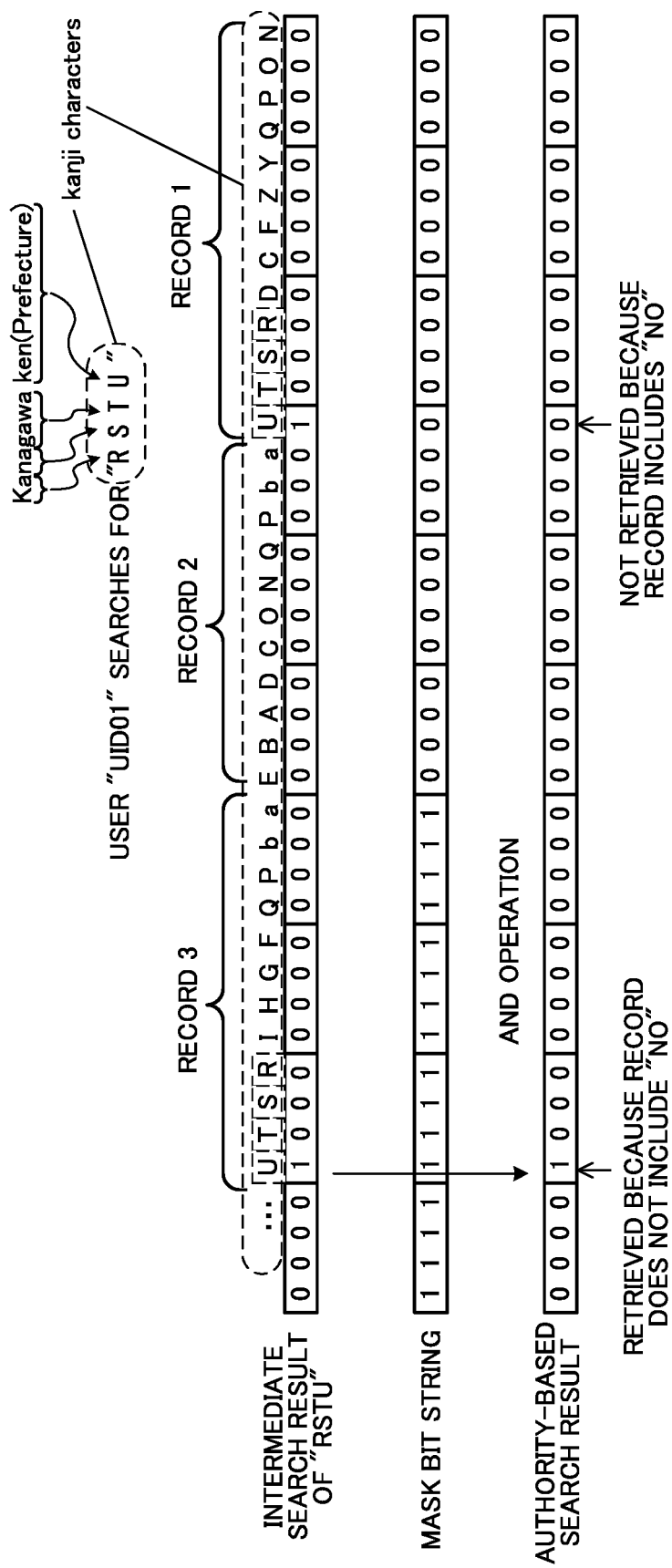
FIG. 28 illustrates an example of a search with excluded record designation.

FIG. 28 illustrates an example of a search with excluded record designation. In FIG. 28, it is assumed that a keyword "神奈川県" (Kanagawa Prefecture) is specified in a search query by the user "UID01". In this case, first, the keyword "神奈川県" is searched for, so that an intermediate search result without restriction by search authority is obtained. An AND operation is performed between the intermediate search result and the mask bit string corresponding to "UID01", so that the operation result is output as an authority-based search result.

In the example of FIG. 28, as for "RECORD 1", "COLUMN 3" for address includes a character string "鎌倉", and another column of "RECORD 1" includes a character string "鎌倉". Therefore, the entire "RECORD 1" is excluded from the search. Accordingly, a character string "神奈川県" included in "RECORD 1" is not retrieved in the authority-based search result. Meanwhile, as for "RECORD 3", "COLUMN 3" for address includes a character string "神奈川県", and none of the columns of "RECORD 3" includes a character string "鎌倉". Therefore, "RECORD 3" is a search target. Accordingly, a character string "神奈川県" included in "RECORD 3" is retrieved in the authority-based search result.

In the manner described above, it is possible to exclude a record that includes a predetermined character string from the search. Note that the excluded record designation may be designation of a character string in a specific column, for example.

(e) Fifth Embodiment

The following describes a fifth embodiment. In the fifth embodiment, only the records whose value in a specific column is within a predetermined range are searched. In other words, the records whose value in a specific column is outside a predetermined range are excluded from the search. In the following description of the fifth embodiment, the differences from the second embodiment will be mainly discussed.

FIG. 29 illustrates an example of an authority management table according to the fifth embodiment. An authority management table 154 illustrated in FIG. 29 includes a column for search target record designation. The column for search target record designation stores the name of the column used for determining whether search authority is given, and the condition related to the value of the column. For example, with respect to the user "UID01", the column stores search target record designation "Department code (COLUMN 1) is "1001-1030"".

In the case where search target record designation is set as described above, the mask bit generation unit 160 generates mask bits for each record in accordance with whether the record is a search target.

Figure 30:
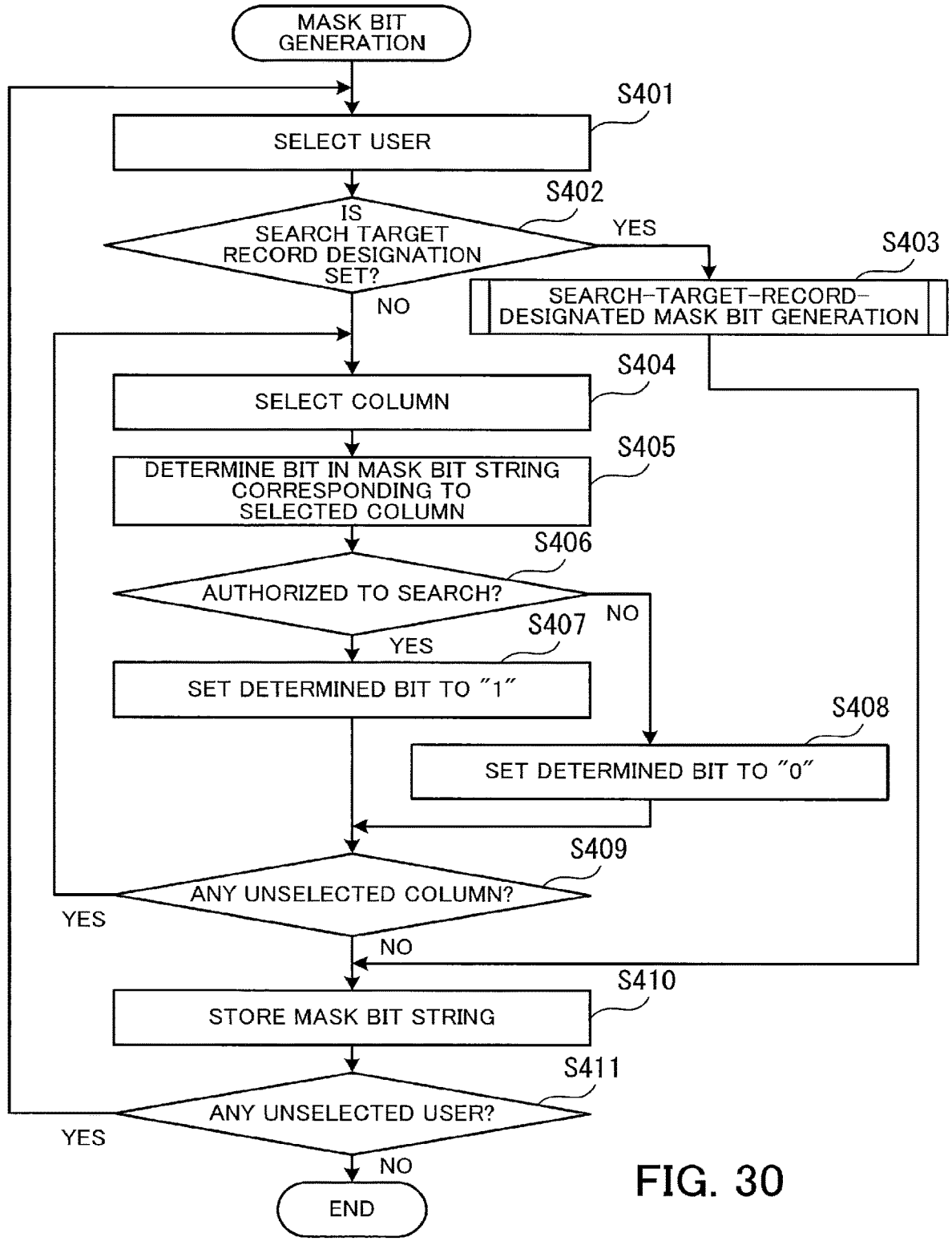
FIG. 30 is a flowchart illustrating an exemplary procedure of a mask bit generation process according to the fifth embodiment.

FIG. 30 is a flowchart illustrating an example of a mask bit generation process according to the fifth embodiment. In the process illustrated in FIG. 30, the operations of step S401 and steps S404 to S411 are the same as the operations of steps S101 to S109, respectively, of the mask bit generation process of the second embodiment illustrated in FIG. 9. The following will describe steps S402 and S403 which are the differences from the second embodiment.

(Step S402) The mask bit generation unit 160 refers to the authority management table 154, and determines whether search target record designation is set for the selected user. If search target record designation is set, the process proceeds to step S403. If search target record designation is not set, the process proceeds to step S404.

(Step S403) The mask bit generation unit 160 executes a search-target-record-designated mask bit generation process. When this process ends, the process proceeds to step S410.

Figure 31:
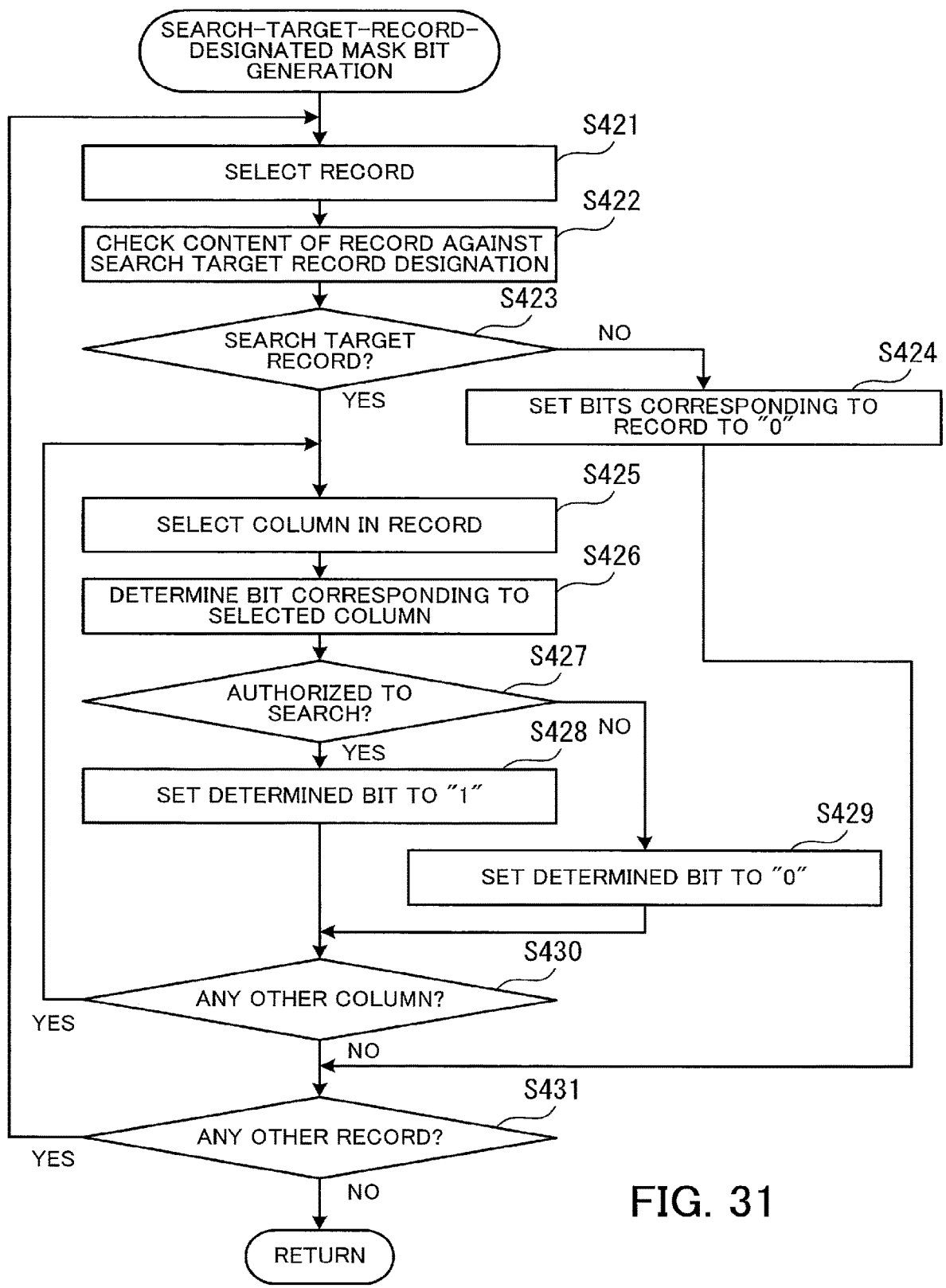
FIG. 31 is a flowchart illustrating an exemplary procedure of a search-target-record-designated mask bit generation process.

FIG. 31 is a flowchart illustrating an exemplary procedure of a search-target-record-designated mask bit generation process. In the process illustrated in FIG. 31, the operations of step S421 and steps S424 to S431 are the same as the operations of step S321 and steps S324 to S331, respectively, of the excluded-record-designated mask bit generation process of the fourth embodiment illustrated in FIG. 26. The following will describe steps S422 and S423 which are the differences from the fourth embodiment.

(Step S422) The mask bit generation unit 160 checks the content of the selected record against the search target record designation that is set for the selected user. For example, it is assumed that the user "UID01" illustrated in FIG. 29 is selected. In this case, the mask bit generation unit 160 determines whether the value of "COLUMN 1" for department code in the selected record is within the range of "1001-1030". If the value of the department code is within the specified range, the selected record is a search target. If the value of the department code is outside the specified range, the selected record is a record to be excluded from the search.

(Step S423) If the mask bit generation unit 160 determines that the selected record is a search target, the process proceeds to step S425. If the mask bit generation unit 160 determines that the selected record is a record to be excluded from the search, the process proceeds to step S424.

In the manner described above, in the fifth embodiment, mask bits are generated to allow a search only on the records specified as the search targets. This allows more detailed designation of the search authority.

Figure 32:
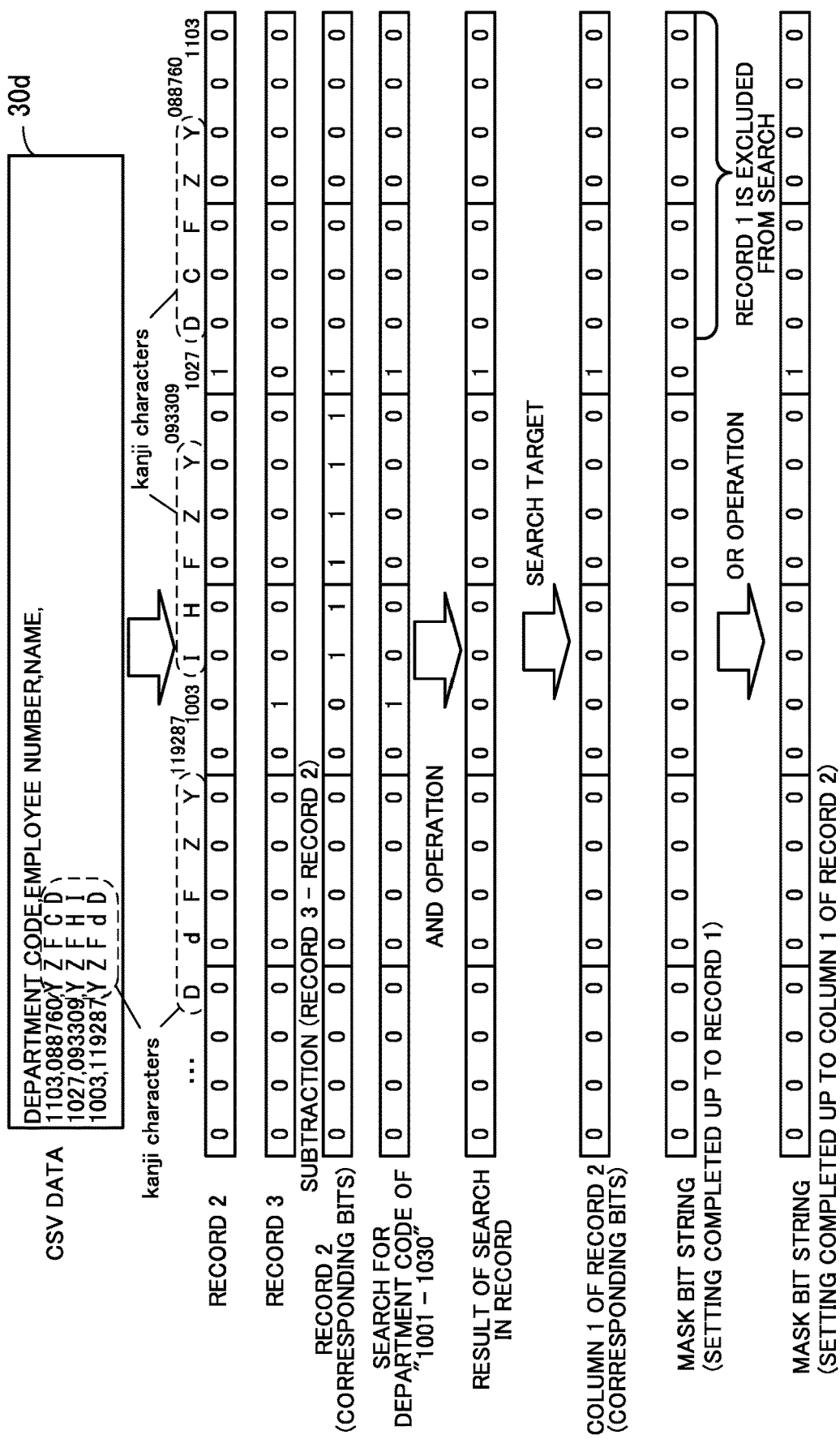
FIG. 32 illustrates an example of mask bit generation with search target record designation based on a number range.

FIG. 32 illustrates an example of mask bit generation with search target record designation based on a number range. In CSV data 30d illustrated in the example of FIG. 32, the column for department code in the first record "RECORD 1" stores "1103". The column for department code in the second record "RECORD 2" stores "1027". The column for department code in the third record "RECORD 3" stores "1003". It is assumed here that a mask bit string of the user "UID01" is generated based on the authority management table 154 illustrated in FIG. 29. It is further assumed that setting of mask bits corresponding to "RECORD 1" is completed, and setting of mask bits for "COLUMN 1" of "RECORD 2" is performed next.

The mask bit generation unit 160 first extracts the bit string indicating the position of the "RECORD 2" and the bit string indicating the position of "RECORD 3" from the record index 131. Then, the mask bit generation unit 160 interprets each bit string as a binary value, and subtracts "RECORD 2" from "RECORD 3". As a result of the subtraction, a bit string is generated in which the bits in the positions of numbers or characters included in "RECORD 2" are set to "1". The mask bit generation unit 160 performs an AND operation between this bit string and the result of the search for a department code in the number range of "1001-1030". The result of this AND operation is the result of the search for a department code in the number range of "1001-1030" in "RECORD 2". That is, if at least one bit is set to "1" in the search result, this indicates that the value of the department code of "RECORD 2" is within the range of "1001-1030". In the example of FIG. 32, the department code of "RECORD 2" is "1027", which is within the number range of "1001-1030". Accordingly, "RECORD 2" is determined to be a search target.

Thus, the mask bit generation unit 160 generates a bit string indicating the positions of numbers or characters included in "COLUMN 1" of "RECORD 2". This bit string is generated using the same method as the method of FIG. 21 used for generating the bit string indicating the positions of numbers or characters included in "COLUMN 1" of "RECORD 2". The mask bit generation unit 160 refers to the authority for "COLUMN 1" specified in the search authority applied to the user "UID01", and determines that authority is given. Then, the mask bit generation unit 160 performs an OR operation between a mask bit string in which setting of mask bits is completed up to "RECORD 1" and a bit string indicating the positions of numbers or characters included in "COLUMN 1" of "RECORD 2". Thus, the bits corresponding to "COLUMN 1" of "RECORD 2" in the mask bit string are set to "1".

In the manner described above, the mask bits are sequentially set, so that the mask bit string for the user "UID01" is completed. Thus, when the user "UID01" performs a search, the search is executed using the mask bit string for the user "UID01".

Figure 33:
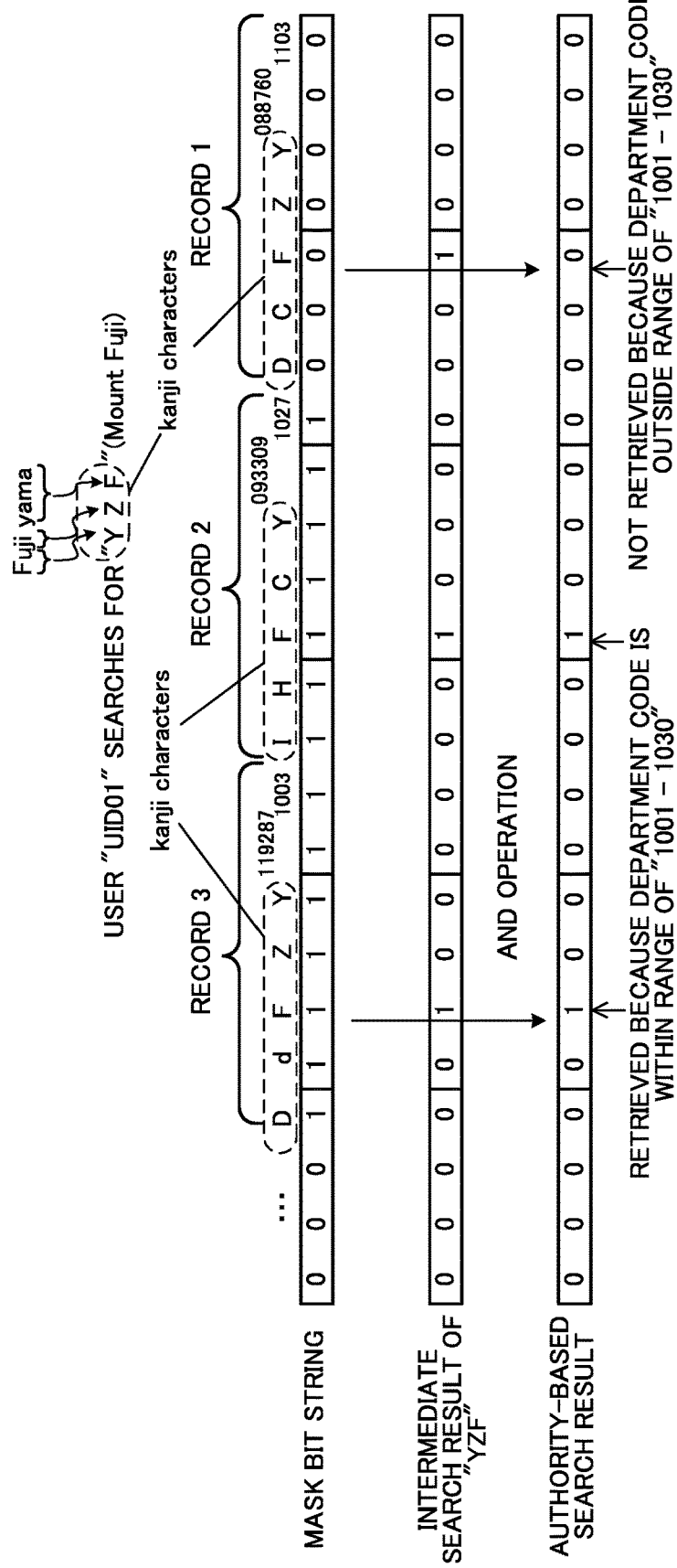
FIG. 33 illustrates an example of a search with search target record designation based on a number range.

FIG. 33 illustrates an example of a search with search target record designation based on a number range. In FIG. 33, it is assumed that a keyword "富士山" (Mount Fuji) is specified in a search query by the user "UID01". In this case, first, the keyword "富士山" is searched for, so that an intermediate search result without restriction by search authority is obtained. An AND operation is performed between the intermediate search result and the mask bit string corresponding to "UID01", so that the operation result is output as an authority-based search result.

In the example of FIG. 33, the department code of "RECORD 1" is "1103", which is outside the specified number range. Therefore, the entire "RECORD 1" is excluded from the search. Accordingly, a character string "富士山" included in "RECORD 1" is not retrieved in the authority-based search result. Meanwhile, the department code of "RECORD 2" is "1027", which is within the specified number range. Similarly, the department code of "RECORD 3" is "1003", which is within the specified number range. Therefore, "RECORD 2" and "RECORD 3" are search targets. Accordingly, a character string "富士山" included in each of "RECORD 2" and "RECORD 3" is retrieved in the authority-based search result.

In the manner described above, it is possible to search only on the records whose value in a predetermined column is within a predetermined number range. Note that search target record designation may be designation of a character string in a specific column, for example.

(f) Other Embodiments

In each of the above embodiments, a mask bit string of each user is generated in advance. However, a mask bit string of a user may be generated when a search request is entered by the user.

According to one aspect, it is possible to improve the security of highly confidential information.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a process comprising:
encoding a file that includes a plurality of records each including a plurality of items separated by delimiters into codes, in units of elements included in the plurality of items of the plurality of records, with use of an encoding dictionary indicating corresponding relationships between the elements and the codes;
generating an index that associates the elements with positions of the respective elements in the file, the index including a first bit string for each of characters that appear in the file, the first bit string indicating positions where the each character appears;

generating mask information indicating a range of a specific search target item among the plurality of items, in the file, the mask information being a mask bit string of mask bits corresponding to the respective elements in the file, a range of the mask bits with a predetermined value being the range of the specific search target item; and searching for one or more element strings within the range of the specific search target indicated by the mask information satisfying a search condition from the elements in the file, based on the index, an intermediate search result of the searching being a second bit string indicating positions where the one or more first element strings satisfying the search condition appear;

performing a bitwise AND operation between the second bit string and the mask bit string; and outputting a result of the bitwise AND operation as a search result indicating positions where one or more second element strings satisfying the search condition appear within the range of the specific search target item.

2. The non-transitory computer-readable storage medium according to claim 1, wherein the specific search target item is an item allowed to be searched.

3. The non-transitory computer-readable storage medium according to claim 1, wherein in the encoding dictionary, information of at least one or more of the elements that are encoded is encrypted.

4. The non-transitory computer-readable storage medium according to claim 1, wherein the generating of the mask information includes determining the search target item, based on which of attributes of items the user who enters the search condition is authorized to search.

5. The non-transitory computer-readable storage medium according to claim 1, wherein the generating of the mask information includes determining, for each of items of a first record, whether to specify the item as the search target item, based on whether an element stored in an item of a specific attribute in the first record satisfies a predetermined condition.

6. The non-transitory computer-readable storage medium according to claim 1, wherein the generating of the mask information includes determining whether to exclude all items of a second record from search target items, based on content stored in an item of the second record.

7. The non-transitory computer-readable storage medium according to claim 6, wherein the generating of the mask information further includes determining to exclude all items of the second record from the search target items when a specific word is included in the second record.

8. The non-transitory computer-readable storage medium according to claim 6, wherein the generating of the mask information further includes determining to exclude all items of the second record from the search target items when a number stored in a specific item of the second record is outside a specific number range.

9. A search method comprising:
encoding, by a processor, a file that includes a plurality of records each including a plurality of items separated by delimiters into codes, in units of elements included in the plurality of items of the plurality of records, with use of an encoding dictionary indicating corresponding relationships between the elements and the codes;

generating, by the processor, an index that associates the elements with positions of the respective elements in the file, the index including a first bit string for each of characters that appear in the file, the first bit string indicating positions where the each character appears;

generating, by the processor, mask information indicating a range of a specific search target item among the plurality of items, in the file, the mask information being a mask bit string of mask bits corresponding to the respective elements in the file, a range of the mask bits with a predetermined value being the range of the specific search target item; and searching for, by the processor, one or more element strings within the range of the specific search target indicated by the mask information satisfying a search condition from the elements in the file, based on the index, an intermediate search result of the searching being a second bit string indicating positions where the one or more first element strings satisfying the search condition appear;

performing, by the processor, a bitwise AND operation between the second bit string and the mask bit string; and outputting a result of the bitwise AND operation as a search result indicating positions where one or more second element strings satisfying the search condition appear within the range of the specific search target item.

10. A search apparatus comprising:
a memory configured to store a file that includes a plurality of records each including a plurality of items separated by delimiters; and
a processor configured to perform a process including:
encoding the file into codes, in units of elements included in the plurality of items of the plurality of records, with use of an encoding dictionary indicating corresponding relationships between the elements and the codes;

generating an index that associates the elements with positions of the respective elements in the file, the index including a first bit string for each of characters that appear in the file, the first bit string indicating positions where the each character appears;

generating mask information indicating a range of a specific search target item among the plurality of items, in the file, the mask information being a mask bit string of mask bits corresponding to the respective elements in the file, a range of the mask bits with a predetermined value being the range of the specific search target item; and searching for one or more element strings within the range of the specific search target indicated by the mask information satisfying a search condition from the elements in the file, based on the index, an intermediate search result of the searching being a second bit string indicating positions where the one or more first element strings satisfying the search condition appear;

performing a bitwise AND operation between the second bit string and the mask bit string; and outputting a result of the bitwise AND operation as a search result indicating positions where one or more second element strings satisfying the search condition appear within the range of the specific search target item.

* * * * *